US010032196B2

(12) United States Patent
Fitzsimmons et al.

(10) Patent No.: US 10,032,196 B2
(45) Date of Patent: Jul. 24, 2018

(54) PRODUCT AND PRESENTATION PLACEMENT SYSTEM AND METHOD

(75) Inventors: Michael R. Fitzsimmons, San Francisco, CA (US); Louis B. Ewens, Novato, CA (US); Matthew B. Reid, Alameda, CA (US)

(73) Assignee: DA IP CORP., Burlingame, CA (US)

( * ) Notice: Subject to any disclaimer, the term of this patent is extended or adjusted under 35 U.S.C. 154(b) by 3667 days.

(21) Appl. No.: 11/127,770

(22) Filed: May 11, 2005

(65) Prior Publication Data

US 2006/0136305 A1    Jun. 22, 2006

Related U.S. Application Data

(60) Provisional application No. 60/571,380, filed on May 14, 2004.

(51) Int. Cl.
| G06Q 30/00 | (2012.01) |
| G06Q 30/04 | (2012.01) |
| G06Q 30/02 | (2012.01) |
| G06Q 30/06 | (2012.01) |
| G09B 19/18 | (2006.01) |

(52) U.S. Cl.
CPC ............ *G06Q 30/04* (2013.01); *G06Q 30/02* (2013.01); *G06Q 30/0241* (2013.01); *G06Q 30/0242* (2013.01); *G06Q 30/0251* (2013.01); *G06Q 30/0256* (2013.01); *G06Q 30/0257* (2013.01); *G06Q 30/0271* (2013.01); *G06Q 30/0276* (2013.01); *G06Q 30/0277* (2013.01); *G06Q 30/0601* (2013.01); *G09B 19/18* (2013.01)

(58) Field of Classification Search
CPC .... G06Q 30/02; G06Q 30/04; G06Q 30/0241; G06Q 30/042; G06Q 30/0251; G06Q 30/0256; G06Q 30/0257; G06Q 30/0271; G06Q 30/0276; G06Q 30/0601; G09B 19/08
USPC ............. 705/14.4, 14.1, 14.49, 14.54, 14.55, 705/14.67, 14.72, 26.1
See application file for complete search history.

(56) References Cited

U.S. PATENT DOCUMENTS

| 5,774,170 A * | 6/1998 | Hite et al. ........................ 725/34 |
| 5,983,200 A * | 11/1999 | Slotznick .................... 705/26.43 |
| 6,006,197 A * | 12/1999 | d'Eon et al. .................... 705/10 |
| 6,434,326 B1 * | 8/2002 | Kondo et al. ................. 386/241 |
| 6,774,939 B1 * | 8/2004 | Peng ........................... 348/231.4 |

(Continued)

FOREIGN PATENT DOCUMENTS

WO    WO 9741673 A2 *  11/1997

*Primary Examiner* — Raquel Alvarez
(74) *Attorney, Agent, or Firm* — Fountainhead Law Group P.C.

(57) ABSTRACT

Viewers of presentations of entertainment, news, education and other the like, often observe unadvertised products of interest therein. However, in order to avoid degrading the artistic or objective integrity, producers and distributors of such presentations, do not provide sufficient product description information to permit the viewer to identify and/or purchase the product. The present invention describes methods and systems for permitting such users to research and/or purchase products observed to be involved in presentations by accessing presentation appearance data, product description data, and issuance data prepared, stored and associated in a non-transitory computer-readable database.

90 Claims, 17 Drawing Sheets

(56) References Cited

U.S. PATENT DOCUMENTS

2002/0073149 A1* 6/2002 Young .......................... 709/204
2003/0037068 A1* 2/2003 Thomas et al. ............... 707/200
2005/0108757 A1* 5/2005 Lee et al. ....................... 725/50
2009/0198625 A1* 8/2009 Walker ................ G06Q 10/087
                                                                                      705/80
2009/0292647 A1* 11/2009 Porat et al. ...................... 705/80

\* cited by examiner

EXAMPLES OF PRESENTATION PLACEMENT DATA

* Program, Movie, Music Video, or Sporting Event name
    * E.g. "Full House", "Forrest Gump", "Thriller", "Superbowl"
* Related Character or role
    * E.g. "Michelle", "Forrest Gump", "Ghoul", "Quarterback"
* Related Actor/Artist or Athlete
    * E.g. "Mary Kate Olsen", "Tom Hanks", "Michael Jackson", "Tom Brady"
* Related Scene or Period
    * E.g. "Bedroom scene 2", "War Montage", "Intro", "3rd quarter"
* ERIE (Episode - Release - Issue - Event)
    * E.g. "Episode 3", "DVD release", "Extended release", "Superbowl XXXIV"
* Unique Media Identifier Code (UMIC)
    * E.g. "1322","399","140093","A4443"
* Visual Quadrant Definitions (V-Quad)
    * E.g. "Top-left", "Bottom-right"
* Out-of-band Media Link
    * E.g. "PID 2332"
* Media Header Block
    * E.g. "ISCII 3332-2332"
* Character Occurrence
    * E.g. "3rd appearance in scene", "Death sequence"
* Production Staff - Producer, Director, Screenwriter, etc.
    * E.g. "George Lucas", "CBS Sports"
* Soundtrack Identification
    * E.g. "Columbia records X223-4453"
* Associated Emotions (expressed by characters, scenes, soundtracks, etc.)
    * E.g. "Sad", "Euphoric"
* Set Description
    * E.g. "Michelle's bedroom"
* Scene Description (time period, year, narrative, etc.)
    * E.g. "Wartime bildungsroman", "Pre-French revolutionary political intrigue"
* Perceived Real World Location
    * E.g. "Contemporary San Francisco", "1939 Germany"
* Actual Real World Location
    * E.g. "Toronto streets", "Burbank studios"
* Camera Angles and Photographic Techniques
    * E.g. "Extreme Closeup"

*Fig. 1A*

* Full Soundtrack Disclosure
    * E.g. "Track 1= 'Intro Sequence', Track 2 = 'Bobby's Theme'..."
* On-screen Captions and Narratives
    * E.g. "Prologue"
* Closed Captioning Text Command
    * E.g. "Insert URL:http://buymenow.com/"
* Automated Camera and Dolly Control Command
    * E.g. "Automated camera #3 used in this sequence"
* Lighting Control
    * E.g. "Filter = red #332 used here"
* Clapboard IDs
    * E.g. "Scene 1, take 23"
* Reel Identification
    * E.g. "ID #2336"
* Audio Mixing Queues
    * E.g. "Voiceover with sea lion bark in background inserted here"
* Pre-production notes and information markers
    * E.g. "Rough cut, credits to roll now"
* In-theater Control – Projector switching, audio engine, volume changes, projection booth operator messages, etc.
    * E.g. "Dim lights and alert projection booth operator now"
* In-theater Effects – 3-D synchronization, scent infusers, fog machine, laser sequencing, secondary image overlays, animated props, etc.
    * E.g. "Release fog", "Revert to 2-D now"
* Genre/Sport
    * E.g. "Sitcom", "Lacrosse"
* Network/Channel
    * E.g. "NBC"
* Studio
    * E.g. "Mark Burnett Productions"
* Related Audience Emotions
    * E.g. "confusion", "tension"

*Fig. 1B*

EXAMPLES OF
PRODUCT DATA

* Product Description
    * E.g. "Blue Jeans"
* Brand
    * E.g. "Levi's casual"
* Make
    * E.g. "Stone-washed"
* Model
    * E.g. "501"
* Manufacturer
    * E.g. "Levis"
* Size(s)
    * E.g. "Avail in S, M, L, and XXL"
* Color(s)
    * E.g. "blue", "black"
* Photo/Video Clip
    * E.g. "Jeansclip110223.mov"
* Product Stock Keeping Unit
    * E.g. "SKU 332-09999898"
* Category
    * E.g. "Apparel"
* Subcategory
    * E.g. "Casual Pants"
* Issuance data:
    * Online profile
        * E.g. "www.levis.com"
    * Vendor/Merchant Classification
        * E.g. "online retailer"
    * Link to Vendor
        * E.g. "http://store.levis.com/jeans/stonewashed/501"
    * Approver
        * E.g. "Mr. Network Executive Number 3"
    * Approval date
        * E.g. "May 30, 2006"
    * Target(s)
        * E.g. "Women 18-34"
    * Billboard location
        * E.g. "101 North, 1 mile from 80 East interchange in San Francisco"
    * Print exposures
        * E.g. "Rolling Stone issue 3223"
    * Radio scatter buy
        * E.g. "Clear Channel Pacific region weight=200"

*Fig. 2*

EXAMPLES OF
RESPONSE DATA

* Estimated universe of enabled users
    * E.g. "110 million television viewing households"
* Estimated universe of enabled online users
    * E.g. "55 million internet-accessible households"
* Estimated universe of users of the medium
    * E.g. "40 million television households, 3 million users online"
* Estimated television audience
    * E.g. "4.2 million television households"
* Estimated online audience
    * E.g. "200,000 internet enabled households"
* Share of audience
    * E.g. "10.5%" or "6.6%"
* Impressions
    * E.g. "2.2 MM"
* Interactions
    * E.g. "2.2 MM"
* Pageviews
    * E.g. "2.2 MM"
* Duration by page
    * E.g. "11.8 seconds per page"
* Session duration
    * E.g. "216 seconds"
* Interaction frequency
    * E.g. "2.1 interactions per user per week"
* Purchase item details
    * Size
        * E.g. "XXL"
    * Color
        * E.g. "Blue"
    * Team
        * E.g. "New England Patriots"
* User details
    * Name
        * E.g. "John Doe"
    * Address
        * E.g. "111 Main, Anytown, USA"
    * Credit Card (if applicable)
        * E.g. "432118344311234 exp 09/08"
    * Phone/email
        * E.g. "555-555-1212/jdoe@isp.com"
* Requests for Information
    * E.g. "2.2 MM"
* Date and time of day
    * E.g. "JUN-03-2006 21:34:10"

*Fig. 3*

Sample Implementation for Presentation Meta-Data Structure

| Meta-Data Level | Description/Examples |
|---|---|
| Level 1: Product Appearance Identification | The minimum data level required in order to support synchronized commerce applications.<br><br>* Related Character<br>* Related Actor<br>* Related Scene<br>* ERIE (Episode – Release – Issue – Event)<br>Unique Media Identifier Code (UMIC) |
| Level 2: Visual Frame Location | Builds upon level 1 data so that featured products can be identified on-screen. This allows for highlighting of products as they appear, clickable area definition, pull-out tabs, etc.<br><br>* Visual Quadrant Definitions (V-Quad)<br>* Out-of-band Media Link – This allows for additional external data to be "linked to" from within the normal Meta Data stream. |
| Level 3: Media Content Detail | Introduces optimization data and additional media detail designed to document properties more efficiently and with expanded detail.<br><br>* Media Header Block – Defines media-wide information, the Reoccurring Events Palette (REP) and other information meant for consumption before the media showing begins.<br>* Character Occurrence<br>* Production Staff – Producer, Director, Screenwriter, etc.<br>Soundtrack Identification (Level 4 defines further Soundtrack Disclosure information) |

*Fig. 10A*

Sample Implementation for Presentation Meta-Data Structure

| Meta-Data Level | Description/Examples |
|---|---|
| Level 4: Complete Media Documentation | Adds a full range of descriptive events disclosing various aspects of the ongoing media content unrelated to product ventures. Though this additional data may not always equate to additional product merchandising opportunities, its existence in the Meta Data provides for far expanded potential applications well beyond commerce.<br>* Automated Camera and Dolly Control<br>* Lighting Control<br>* Clapboard IDs<br>* Reel Identification<br>* Audio Mixing Queues<br>* Pre-production notes and information markers<br>* In-theater Control - Projector switching, audio engine, volume changes, projection booth operator messages, etc.<br>* In-theater Effects - 3-D synchronization, scent infusers, fog machine, laser sequencing, secondary image overlays, animated props, etc.<br>* Emotions expressed by characters, scenes, soundtracks, etc.<br>* Set Description<br>* Scene Description (time period, year, narrative, etc.)<br>* Perceived Real World Location (i.e. "A wild west prairie wasteland")<br>* Actual Real World Location (i.e. "Back lot of studio X, made to look like a prairie wasteland")<br>* Camera Angles and Photographic Techniques<br>* Full Soundtrack Disclosure (Name, Composer, Artist, Lyrics, Instrumentation, etc.)<br>* On-screen Captions and Narratives<br>Closed Captioning Text (All Supported Languages and Character Sets) |
| Level 5: Standardization for insertion with Media Industry Control Codes (MICC) | MICC adds support for embedded control codes which can be used by media companies to establish any arbitrary time scene definitions, commercial break opportunities, automated projector control, audio engine (noise standards like THX, Dolby Digital) control, etc. |

*Fig. 10B*

PRODUCT AND PRESENTATION PLACEMENT SYSTEM AND METHOD

CROSS REFERENCE TO RELATED APPLICATION

This application claims the benefit of Provisional Application No. 60/571,380 filed on May 14, 2004.

BACKGROUND OF THE INVENTION

Potential consumers are exposed to many products used in movies, television shows, live events, recorded video, and other media. Unfortunately, if the potential customers wish to acquire such products, few leads exist to direct the potential customers in their pursuit of these products. Sales never materialize and desires remain unfulfilled.

In some of the areas of implementation, the historical segregation of advertising and marketing messages from the entertainment and news content around which they are scheduled has been significantly challenged in recent years with the advent of new technologies enabling consumers and resellers (users) of the entertainment and news content to efficiently dilute, skip, or remove these advertising and marketing messages. Since the purveyors of these advertising and marketing messages typically sponsor the content around which the messaging is scheduled, this has proven problematic for producers and distributors of the entertainment and news content, who have sought new ways to retain the viability of their media for carrying their sponsors' messages.

In these areas of implementation, one of the most common means for retaining this viability is through product placement and obvious sponsorship depicted within the entertainment and news presentations themselves. Unfortunately, conventional opportunities for product placement and sponsorship are limited to the obviousness of a brand logo or name on a wardrobe or prop item—a shirt label, camera brand name, or distinct vehicle body type, for example. Paying sponsors expect the object to be shown in such a way that a viewer can distinguish the sponsor's brand from competitor brands in the same product market category. This requires exceptional visual and/or aural attention which is not afforded to all shown objects that occur incidentally in a presentation, and furthermore threatens to undermine the artistic or objective credibility of the entertainment and news presentation. Thus, opportunities for sponsorship and product placement are limited in conventional entertainment, news, and other presentations.

BRIEF DESCRIPTION OF THE SEVERAL VIEWS OF THE DRAWING(S)

FIGS. 1A-1B show examples of presentation placement data.

FIG. 2 shows examples of product data.

FIG. 3 shows examples of response data.

FIGS. 10A-10B shows a sample implementation for presentation meta-data structure.

Figure 13:
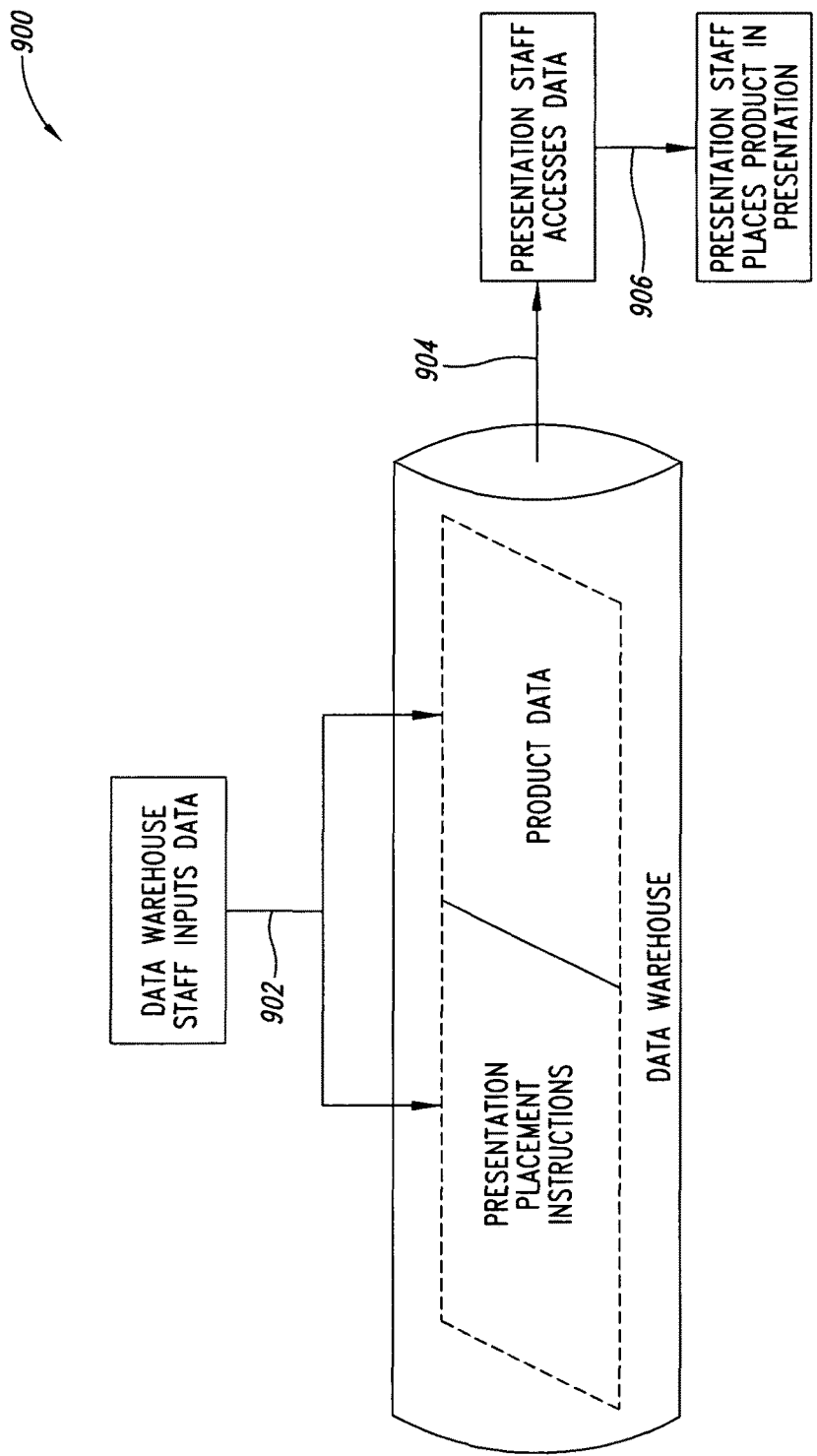

FIG. 13 a flow diagram depicting an approach for aggregating and disseminating data according to an embodiment in which data warehouse staff initially input presentation placement instructions.

Figure 14:
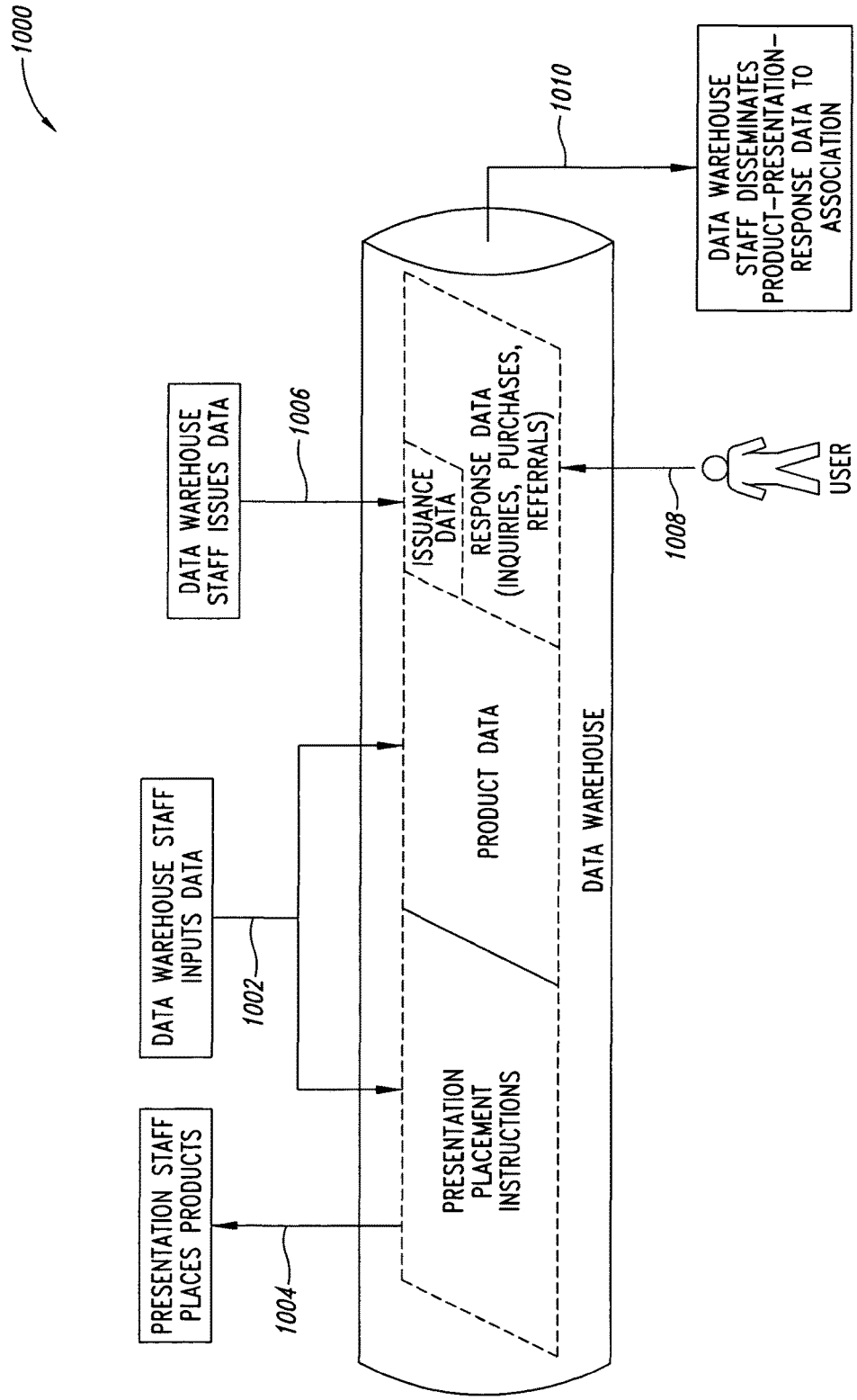

FIG. 14 is a flow diagram depicting an approach for aggregating and disseminating data, and for placing and receiving an order according to an embodiment in which data warehouse staff initially input presentation placement instructions.

Figure 15:
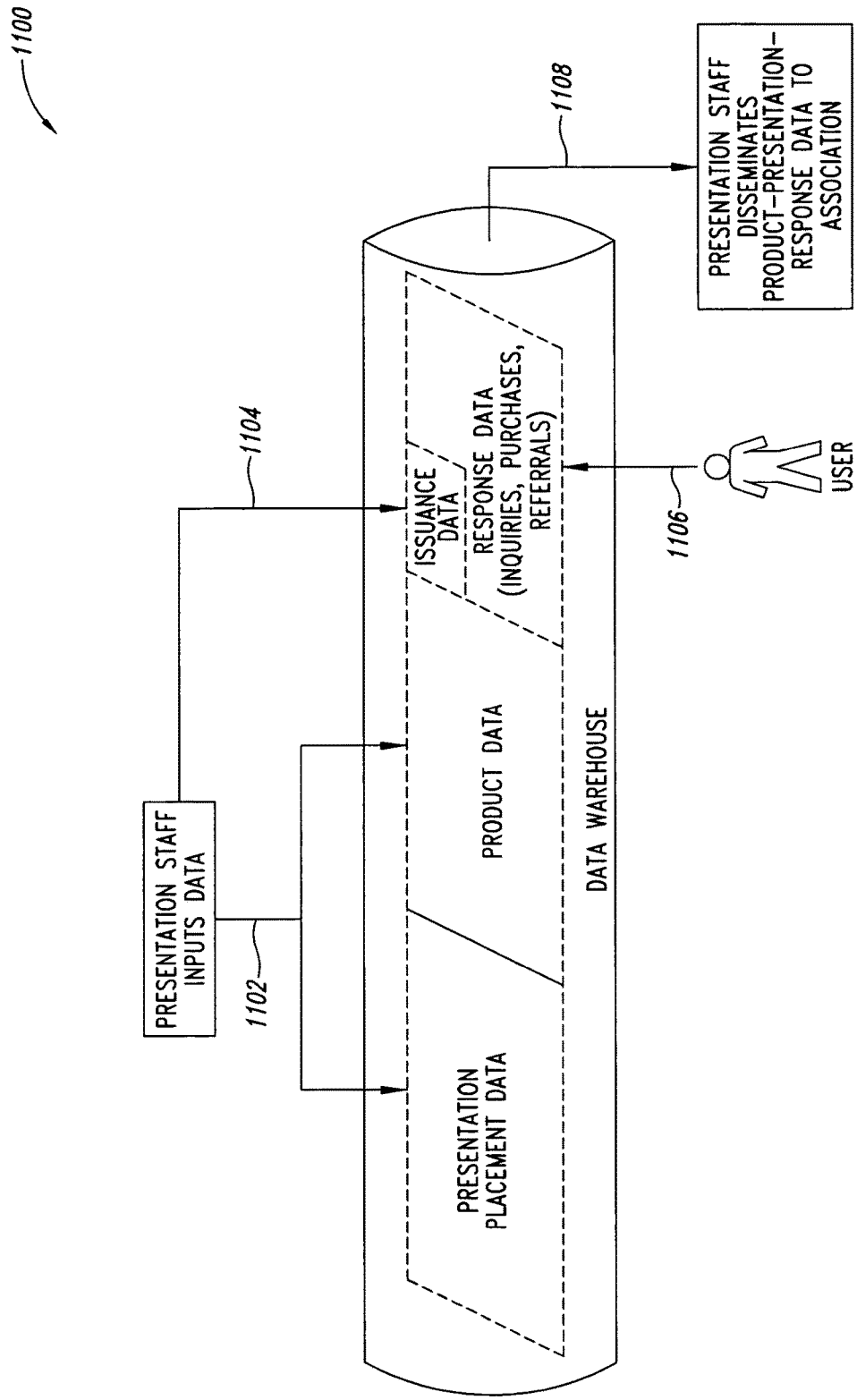

FIG. 15 is a flow diagram depicting an approach for aggregating and disseminating data, and for placing and receiving an order according to an embodiment in which presentation producers both input initial data and issue the data for users.

SUMMARY OF THE INVENTION

In accordance with the purposes of embodiments of the present invention, as embodied and broadly described herein, the method for purchasing a product, hereof, includes: specifying an unadvertised product appearance in a portion of a presentation; generating an electronic database stored on a non-transitory computer-readable medium including information describing the specified unadvertised product, the product appearance in the presentation, the association of the product with the product appearance, and purchase information for the product; viewing the portion of the presentation, whereby the unadvertised product and the product appearance in the presentation are observed; and querying the database using an input device to obtain information effective for purchasing the product.

In another aspect of embodiments of the present invention, and in accordance with its purposes, the method for identifying a product, hereof, includes: specifying an unadvertised product appearance in a portion of a presentation; generating an electronic database stored on a non-transitory computer-readable medium including information describing the specified unadvertised product, the product appearance in the presentation, and the association of the product with the product appearance; viewing the portion of the presentation, whereby the unadvertised product and the product appearance in the presentation are observed; and querying the database using an input device to obtain information sufficient to identify the product.

In yet another aspect of embodiments of the present invention, and in accordance with its purposes, the method, hereof, includes: generating an electronic database stored on a non-transitory computer-readable medium, including presentation appearance data regarding a presentation containing an involvement of an unadvertised product, product data and an association between the presentation appearance data and the product data.

In still another aspect of embodiments of the present invention, and in accordance with its purposes, the system for purchasing a product, hereof, includes: means for specifying an unadvertised product appearance in a portion of a presentation to obtain a product description; an electronic database stored on a non-transitory computer-readable medium including information describing the specified unadvertised product, the product appearance in the presentation, the association of the product with the product appearance, and purchase information for the product; means for viewing the portion of the presentation, whereby the unadvertised product and the product appearance in the presentation are observed; and an input device for querying the database to obtain information effective for purchasing the product.

In another aspect of embodiments of the present invention, and in accordance with its purposes, the system for identifying a product, hereof, includes: means for specifying an unadvertised product appearance in a portion of a presentation; an electronic database stored on a non-transitory computer-readable medium including information describing the specified unadvertised product, the product appearance in the presentation, and the association of the product with the product appearance; means for viewing the portion of the presentation, whereby the unadvertised product and the product appearance in the presentation are observed; an input device for querying the database to obtain information sufficient to identify the product.

In yet another aspect of embodiments of the present invention, and in accordance with its purposes, the system, hereof includes: an electronic database stored on a non-transitory computer-readable medium including presentation appearance data regarding a presentation containing an involvement of an unadvertised product; product data, and an association between the presentation appearance data and the product data.

In still another aspect of embodiments of the present invention, and in accordance with its purposes, the non-transitory computer-readable medium, hereof, includes program instructions for: specifying an unadvertised product appearance in a portion of a presentation; generating an electronic database including information describing the specified unadvertised product, the product appearance in the presentation, the association of the product with the product appearance, and purchase information for the product; viewing the portion of the presentation, whereby the unadvertised product and the product appearance in the presentation are observed; and querying the database using an input device to obtain information effective for purchasing the product.

In another aspect of embodiments of the present invention, and in accordance with its purposes, the non-transitory computer-readable medium, hereof, includes program instructions for: specifying an unadvertised product appearance in a portion of a presentation; generating an electronic database describing the specified unadvertised product, the product appearance in the presentation, and the association of the product with the product appearance; viewing the portion of the presentation, whereby the unadvertised product and the product appearance in the presentation are observed; and querying the database using an input device to obtain information effective for identifying the product.

Benefits and advantages of the present invention include, but are not limited to, a viewer of a presentation being able to witness a presentation-product connection for an unadvertised product, research the product online, and place an order for the product using an input device, without the requirement that the product be advertised in the presentation, which would degrade the artistic or objective integrity of the presentation.

DETAILED DESCRIPTION OF THE INVENTION

Aspects are presented in which users of presentations of entertainment, news, education and other can research and/or purchase products observed to be involved in the presentations by using presentation placement data and a product description obtained through observation, the product description being insufficient alone to fully support such research and/or purchasing activities. Product data and presentation placement data are stored and associated. Issuance data may also be stored and associated with the product data and the presentation placement data. Various methods and systems are used to provide access to one or more of these data and associations. Producers and distributors of presentations can continue to enhance and sustain the viability of their various media via paid product placements and sponsorships without degrading artistic or objective integrity in the production and distribution of entertainment, news, and other presentations.

Approaches are used to address situations when a user would not have sufficient information directly about a product to be able to find the product and/or to purchase the product. In many of these situations the user may only have sufficient information specifically about a product from observation of product involvement in a presentation to be able to identify a general class that the product may be associated with but not the particular product itself. For example, a user may only know that the product was a pair of sunglasses used or referred to in a presentation observed by the user, but the user could not describe the sunglasses in any sufficient detail to find further information about the sunglasses including possibly purchasing information.

Systems and methods regarding product identification for presentations are discussed. Sources for this information can be the producers and creators of the presentations themselves, who currently do not have consistent or efficient methods for aggregating, storing, and disseminating this information. For example, production "Stylists" still compile hand-written information about props and wardrobe for each scene into a 3-ring binder and attach a Polaroid picture for reference. Such recordkeeping practices do not comprise a reliable and efficient process which can be leveraged to publish product data for easy access by interested users of entertainment and news presentations.

Aspects involve product placement in various presentations in which users of the content of these presentations can research products used in these presentations. A process for procuring and disseminating the primary source information is described. In the following description, for the purposes of explanation, specific details are set forth in order to provide a thorough understanding. However, it will be apparent that aspects may be practiced without these specific details. In other instances, well-known structures and devices are depicted in block diagram form in order to avoid unnecessarily obscuring information.

As used herein, the term "data" is synonymous with "information", and refers to any information that can be aggregated and subsequently disseminated. FIGS. 1-3 list an exemplary implementation of a definition of data, but data is not limited to this example. Data can include text strings as stored digitally on a computer, but may also include entire media files—for example film clips displaying a product or scene from a television program or film.

"Data" may also include actual machine-readable commands which are stored in physical or virtual media for distribution 610—for example code which instructs a decoding and displaying device such as a television's set-top box to request permission from the on-screen display to display images from a set of instructions to follow in the data stream. In another example, data can be a set of instructions intended to be relayed by the decoding and displaying device such as a television set-top box through a wireless or serial cable transport mechanism to another device—for example, a nearby lamp.

Examples of data stored as text strings on a computer include presentation data, product data, issuance data, and response data.

Presentation data describe where, when, how, and why a product appeared or will appear in a presentation. More specific examples of presentation data are listed in FIGS. 1A-1B.

Product data describe a product. More specific examples of product data are listed in FIG. 2.

Issuance data describes the manner in which a product opportunity was made available to users. Additionally, in implementations, issuance involves inserting data into the presentation itself, which serves two purposes—to facilitate a product opportunity synchronous with its presentation in the same medium, and also to facilitate the transport of machine-readable commands. Product opportunities must include as many presentation and product data points as required so that an average user can generally identify the presentation from which the product came, and can distinguish the product itself from a similar product in the same product market from; for example, a competitor's offering.

Examples of product opportunities include product listings in an online or print catalog (e.g. shopping.com and Montgomery Ward's), online retail establishments (for example toysrus.com), visual displays in brick and mortar retail establishments (for example Barnes and Noble), print advertisements in magazines and newspapers (for example, the San Francisco Chronicle), direct mail (for example, a bulk rate postcard sent via United States Postal Service), radio ads (for example, a 10 second spot on a radio station in Memphis), television commercials (for example, a 30 second spot on a local affiliate of a national broadcaster in San Francisco), automated Interactive Voice Response phone systems, telephone customer service representative scripts, and billboard advertising.

Product opportunities are usually grouped according to the presentation or presentation class to which they occur (for example, General Hospital is a presentation within the soap opera presentation class, so a product opportunity associated with General Hospital may appear in the context of General Hospital or Soap Operas). Product opportunities may be targeted to specific users based on the targeting of the presentation and/or the characteristics of the users. In some cases, opportunities must be approved by authorities representing the presentation, the product, or both. Issuance data describes each of these attributes of product opportunities as applicable.

Response data describe where, when, and how a user interacts with the presentation-product data that has been issued. More specific examples of response data are listed in FIG. 3.

Two combinations of these three types of data are often used below—the first is the combination of all three types of data ("presentation-product-response" data) while the second is the combination of just the first two types of data ("presentation-product" data). Either combination of data also may or may not contain issuance data.

As used herein, the term "presentation" includes venues associated with entertainment, news presentation, education or other purposes. Some examples of "entertainment" include television shows (e.g. action/adventure, animated, anthology, cartoons, children's, comedy, cop/detective, courtroom/legal, drama, educational, game, infomercial, medical, music, sci-fi, fantasy, situation comedies, sports, talk/variety shows), films (e.g. feature, documentary, and short films), sports, music, theatrical plays, opera, video games, and live stand-up comedy. In addition to these entertainment types, components of each type are implied by "entertainment"—such as scenes in plays, acts in operas, locations in films, sets in television shows. Some examples of "news" include political commentary programs, televised political events, television advertisements, and news broadcasts. "Presentation" refers to the manner in which the entertainment, news, education, or other content is distributed—whether live and in-person (e.g. music concert, sporting event, political rally, opera, theatrical play, television program taping), or whether an electronic medium broadcast live (via radio, television, film, telephone, wireless network, or internet) or distributed as a recorded asset stored in non-volatile Random Access Memory of a tape, other magnetic medium, or optical medium.

As used herein, a "product" is anything which can be requested or purchased. A product can be an item itself—for example, a sofa; detailed information about a product—for example, a brochure listing specifications of a pickup truck; a subscription to receive a product or service repeatedly over a certain period of time—for example, a newspaper subscription for 8 weeks, or gardening service for 1 year; or a vacation or entertainment package sold as a group of tickets and reservations to various modes of transport and/or events. Products belong to categories and subcategories within product categories. Product categories may include, but are not limited to:

Apparel, Automotive, Computers, Electronics, Fashion Accessories, Flowers and Gifts, Food and Beverages, Health and Beauty, Home and Garden, Media (Books, Music, Movies, Magazines and Games), Office, Outdoor and Sporting, Shoes, Toys and Collectibles, Travel and Entertainment.

As used herein, a "product opportunity" is explicit information which reveals a presentation-product connection or an association between product data and presentation placement data, and includes information on how to learn more about the connection, or the product whether through inquiry, referral, or purchase. For example, on toysrus.com an item may appear which includes digital text which reads "click here to purchase the same teddy bear Michelle totes around in 'Full House'".

As used herein, "presentation instructions" refer to presentation data which are treated as explicit instructions as to how to accomplish a task. Specifically, the instructions may indicate, for example, that certain apparel (identified by brand, make, and model) be worn by certain visible actors in specific scenes in an entertainment presentation. For example, a presentation instruction may read: "Ted Danson playing Sam must wear a Charter Club striped Rugby shirt while tending bar in scene 2 of Cheers episode #13".

As used herein, "backend infrastructure data warehouse" and "data warehouse" include a computer or multiple computers in a networked environment that may be secure and which hosts a database into which data is delivered, in which data is transformed and manipulated and from which aggregated, raw, and/or transformed data is disseminated.

As used herein, a "network" by which presentation-product-response and presentation-product data are aggregated and disseminated refers to any communications network—such as a telecommunications network, wireless network, an environment of networked computers (Local Area Network, Wide Area Network, internet), a network existing on single or multiple computer servers accessible via Virtual Private Network, a network facilitating the transfer of Extensible Markup Language files, and a network facilitating hyper-text transfer protocol using Transmission Control Protocol/Internet Protocol. As used herein, "online" is an adjective or adverb describing processes or places existing on a network, as described above. For example, an "online" store is one that cannot be physically touched by its patrons, but that exists only insofar as its patrons procure data using input devices, for example personal computers, from host servers in which the online store's product opportunities are stored.

As used herein, a "means of payment" refers to any means by which a consumer can successfully transfer legal tender through a transaction to obtain goods and/or services, whether the legal tender is direct (debit, cash, check, money order, Cash On Delivery), or indirect (credit card, warrant, option, or promissory note) or other methods of payment.

As used herein, both "presentation staff" and "data warehouse staff" are the originators and disseminators of presentation-product data. "Presentation staff" refers to individuals directly involved in the production and distribution of entertainment, news, education and other presentations. Examples include production assistants, production accountants, wardrobe stylists, makeup and hair stylists, set dressers, writers, screenplay writers, scriptwriters, actors, camera operators, production editors, production liaisons, production marketing representatives, directors, casting directors, and executive producers. "Presentation staff" also includes individuals from entities which work closely with editors, scriptwriters, set dressers, hairdressers, directors, producers, and wardrobe and makeup stylists, in order to ensure that their product placement clients are visually or aurally represented in a presentation. Examples of this include product placement agency representatives, talent agency representatives, media planners, and advertising agency account executives. "Data Warehouse staff" refers to individuals involved in aggregating and disseminating the presentation-product as well as the presentation-product-response data. In some cases the Data Warehouse staff also originates presentation-product data in a complementary fashion, or in fact serves as product placement representative for a client, while in some cases the Data Warehouse staff is not involved at all with the aggregation and dissemination of presentation-product or presentation-product-response data. Examples of Data Warehouse staff include merchandising staff, database administrators, online store managers, data input operators, and data analysts.

As used herein, both "users" and "association" are recipients of the disseminated presentation-product-response and the presentation-product data. An "association" is a group of members who may or may not be syndicated, who receive disseminations of either presentation-product data, or disseminations of presentation-product-response data. Examples of "association" members include online retail merchants, brick and mortar retail establishments, interactive television service providers, cable operators, satellite operators, print publishers, online shopping catalogs, media planning agencies, product placement agencies, advertisers, and companies which pay to place product advertising and messaging in entertainment presentations. Data may be disseminated to association members either free of charge or as part of a pecuniary transaction—the latter of which may be a one-time-only transaction, or an installment payment proffered via a subscription agreement. Dissemination of data to the association may be governed in tiered licensing agreements through which different sets of presentation-product or presentation-product-response data are sold to different association members. A "user" refers to any entity which interacts with issued presentation-product data, or has the opportunity to do so, and as a consequence of this interaction or potential to interact, generates response data. Examples of "users" include individuals exploiting the product opportunity (purchase, inquiry, and/or referral), individuals with access to the product opportunity (whether online, watching television, living in households with telephones, or living in physical proximity to a live event), resellers, and automated data retrieval services.

Figure 4:
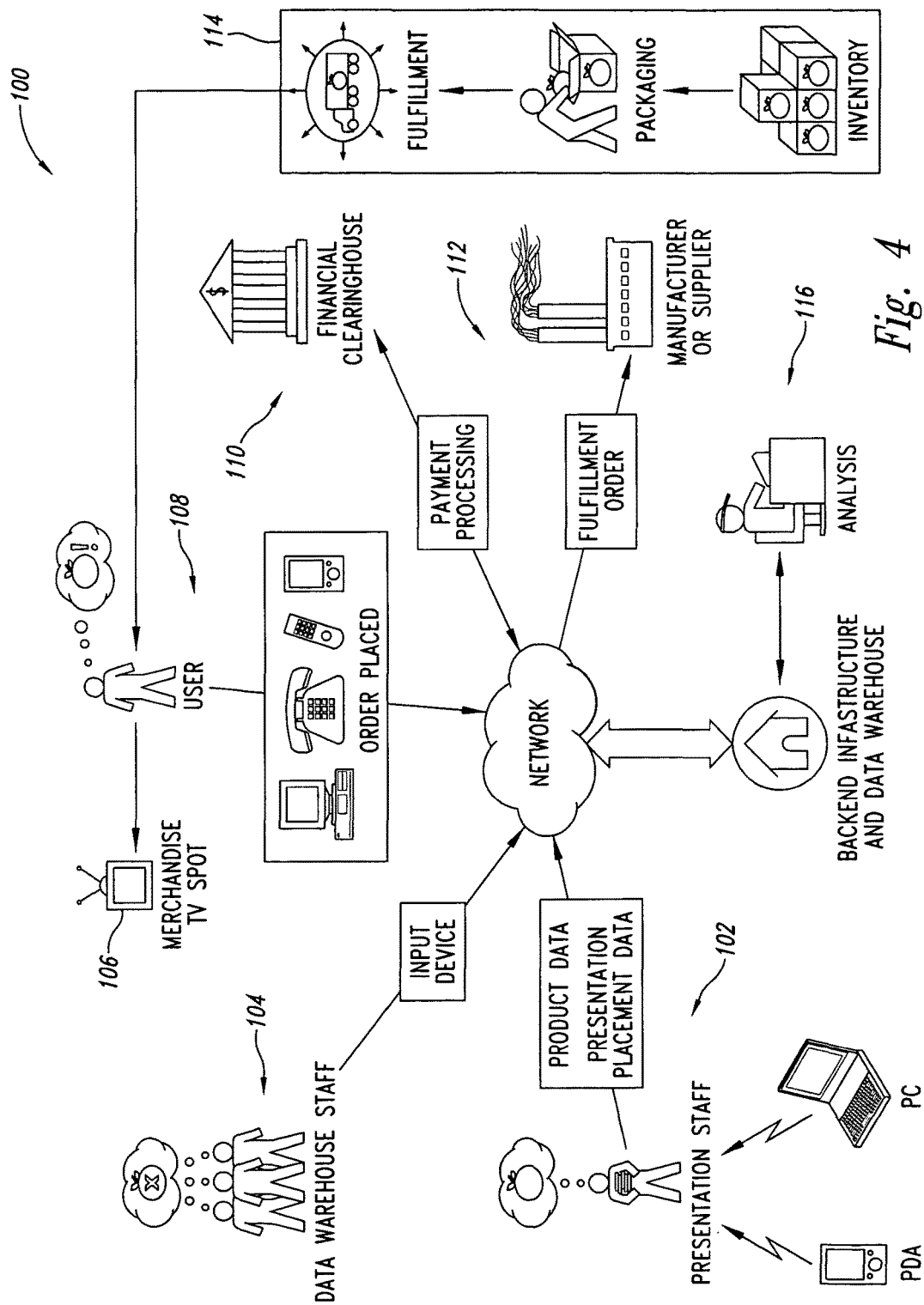
FIG. 4 is a diagram depicting an approach for aggregating and disseminating data, and for placing and receiving an order according to an embodiment.

In FIG. 4 an exemplary implementation of a system 100 for aggregating and disseminating data, and for placing and receiving an order is depicted 100. Presentation staff inputs presentation and product data 102. Data warehouse staff, using input devices, also input additional presentation and product data, and after procuring any required approvals concerning the product opportunity, issue data 104. At a scheduled time, the presentation described in the presentation-product data occurs 106. The user witnesses the presentation-product connection, researches it online, and places an order for the product using an input device—which can include a personal computer (logged into an online store), telephone, interactive television application (using the remote control), or a personal digital assistant 108. In some cases the issuance data for the order will be modified in real-time by promotions or coupon codes, and the order itself may be modified through item cross/up selling which leverages dynamic managed content. For example, the user may be presented with a "10% off" coupon which enables the user to deduct 10% of the total purchase price from the order total for the product to which it refers. In all cases financial transactions placed online benefit from secure checkout and easy catalog navigation. For example, at the point of sale in an online transaction, the credit card number is submitted into an online form presented by a central server, the contents of which are retrieved and/or submitted via secure hypertext transfer protocol. In this exemplary implementation, the credit card information is stored neither in the backend infrastructure, nor in a file resident on the user's computer (for example, a "cookie"). When the payment mechanism is input, request for payment is made to the financial clearinghouse required to complete the transaction (bank, credit bureau, etc) 110, or direct means of payment are submitted. Upon receipt of payment or confirmation of validation of means of payment, the order is forwarded to a fulfillment entity for fulfillment 112. In some cases, the data warehouse staff will have taken a position in the inventory and will fulfill the order directly, while in other cases the data warehouse staff will process the financial transaction and product details will be forwarded to an outside vendor for fulfillment. In other cases the data warehouse staff will forward both the financial and transaction details to an outside vendor for fulfillment, and in still other cases, no transaction details are forwarded, but the user is transferred to an outside merchant who then requests and accepts all of the transaction details from the user. In the exemplary implementation, the order product details are forwarded to an outside vendor for fulfillment, and the financial transaction is executed by data warehouse staff. Once inventory is confirmed and the product is available for shipment, indirect means of payment are completed (if payment was direct, payment has already been received by this point), the financial transaction is completed, the user is notified, and the product is shipped to the user 114. Response data is logged at the data warehouse, and is used for the analysis of presentation-product-response data 116.

Figure 5:
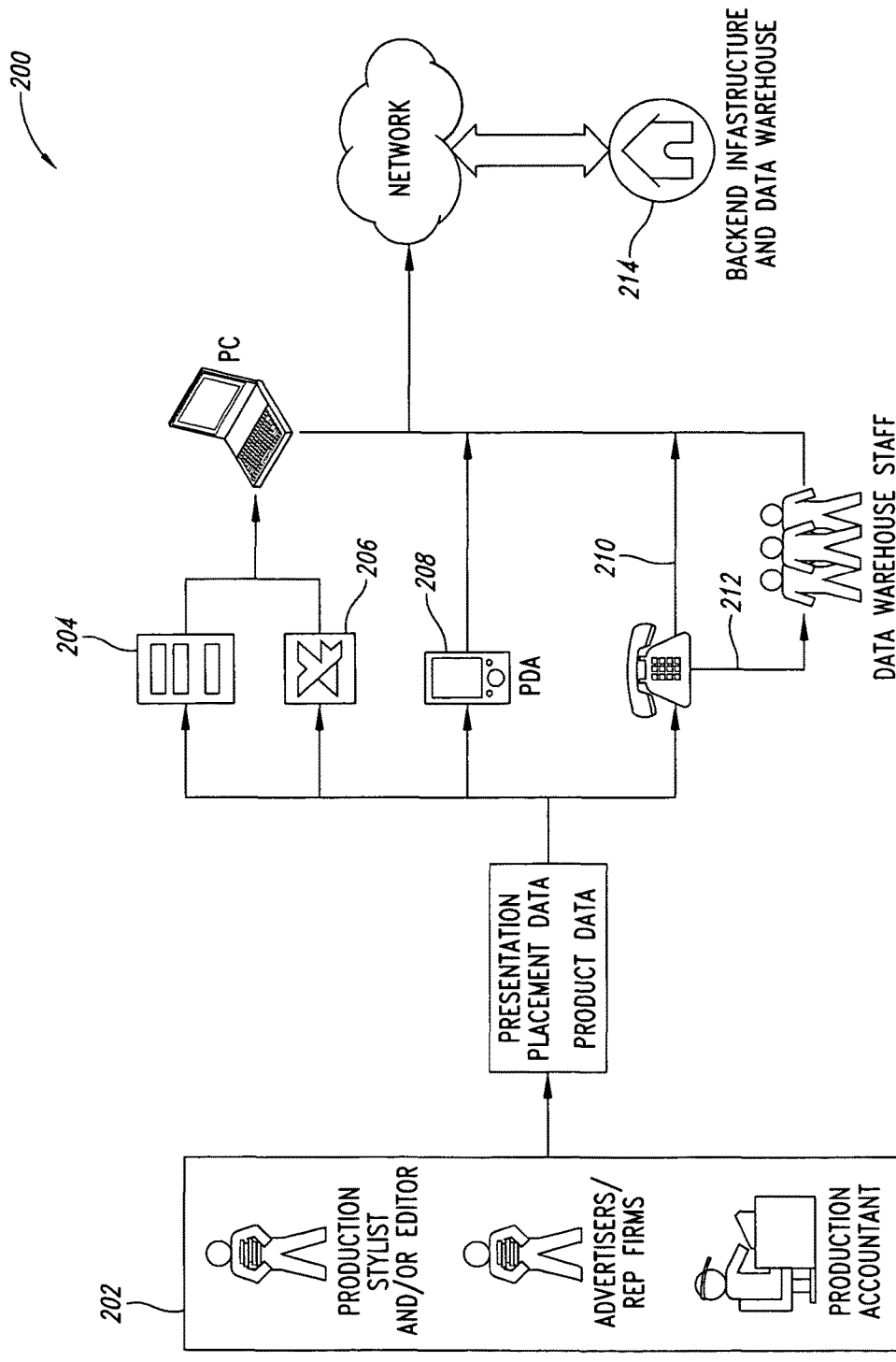
FIG. 5 is a flow diagram depicting an approach for aggregating and compiling data according to an embodiment.

In FIG. 5 presentation staff 202 input presentation and product data via input devices, which can include an online form 204, file upload to an online destination 206, upload via Personal Digital Assistant/tablet computer synchronization 208, telephone connected directly to the network (using an Interactive Voice Response system) 210, or telephone answered by a customer service representative who in turn inputs the data via network 212. The presentation and placement data is submitted via the network to the backend infrastructure and data warehouse 214. This presentation data may also include pre-approvals from authorities representing the presentation, product, or both. Thus multiple means by which presentation staff can submit data are depicted 200.

Figure 6:
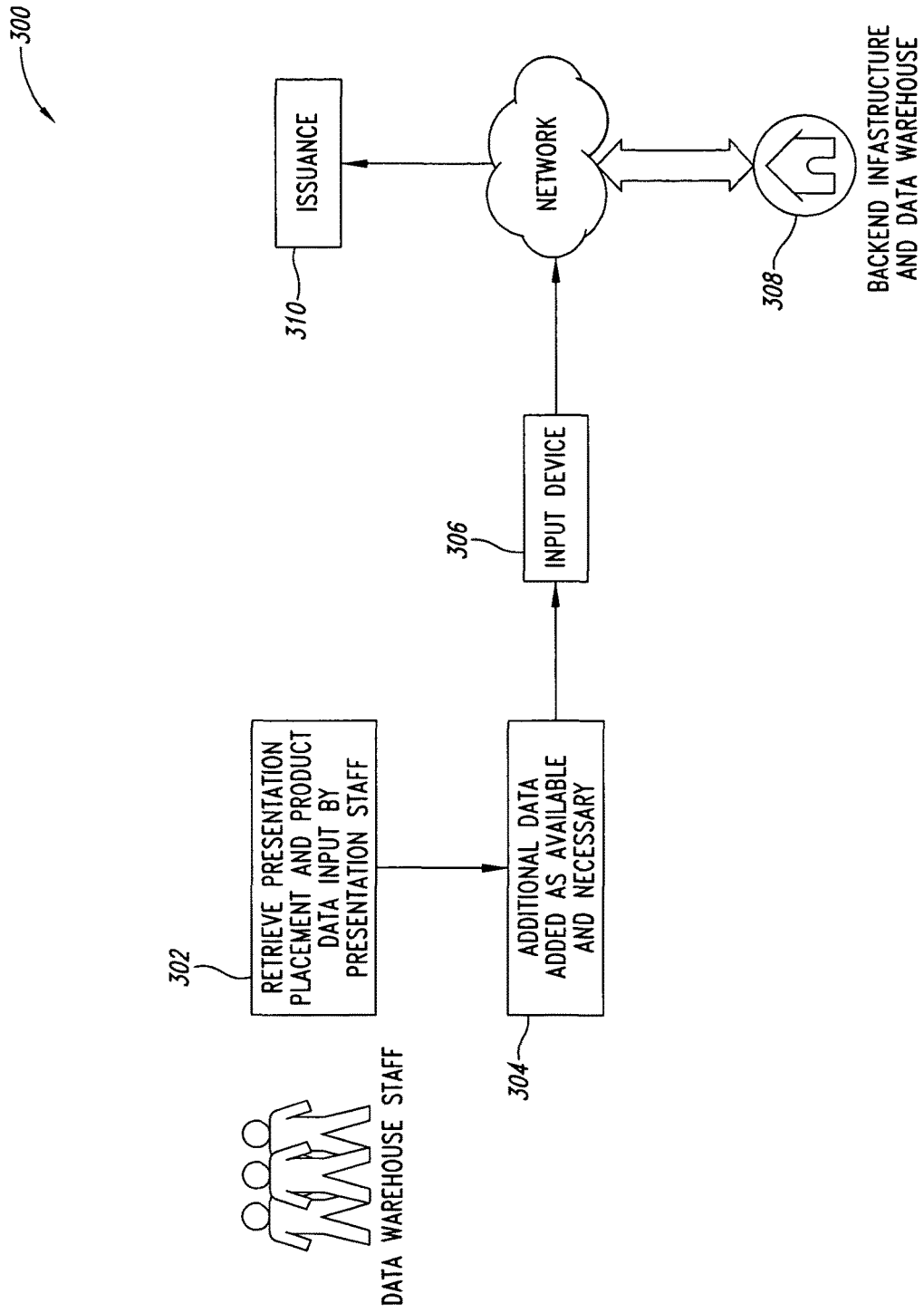
FIG. 6 is a flow diagram depicting an approach for aggregating, compiling, and disseminating data according to an embodiment.

In FIG. 6 data warehouse staff retrieves 302 the presentation-placement data input by presentation staff 200, and adds additional presentation-placement data as necessary 304. In the exemplary implementation the data added in this step is descriptive category-level data used to merge multiple products and multiple placements and multiple presentation-product data sets together during analysis 116. Other scenarios of this implementation 300 will include additional data required to complete a minimum required threshold of information either for purposes of distribution to an association 506 or issuance for users 508. The data warehouse staff will use input devices such as an online form, a file upload process also on computer, or through personal digital assistant or automated telephone Interactive Voice Response system 306. The additional presentation-product data is transmitted over the network to a backend infrastructure and data warehouse 308. Once stored in the data warehouse, the data warehouse staff will then, in many cases and assuming that proper authorization has been procured, formally issue the data by making it available as product opportunities for users to retrieve and interact with 310, where the intended users are in this case those expected to generate response data. Once data has been issued, the presentation has already occurred or been scheduled. Ideally, the presentation-product data is issued simultaneously with the presentation event. In the exemplary implementation 100 the presentation-product data is issued 30 minutes after the scheduled presentation event. Issuance data describing how the presentation-product data is issued is also stored in the data warehouse.

Figure 7:
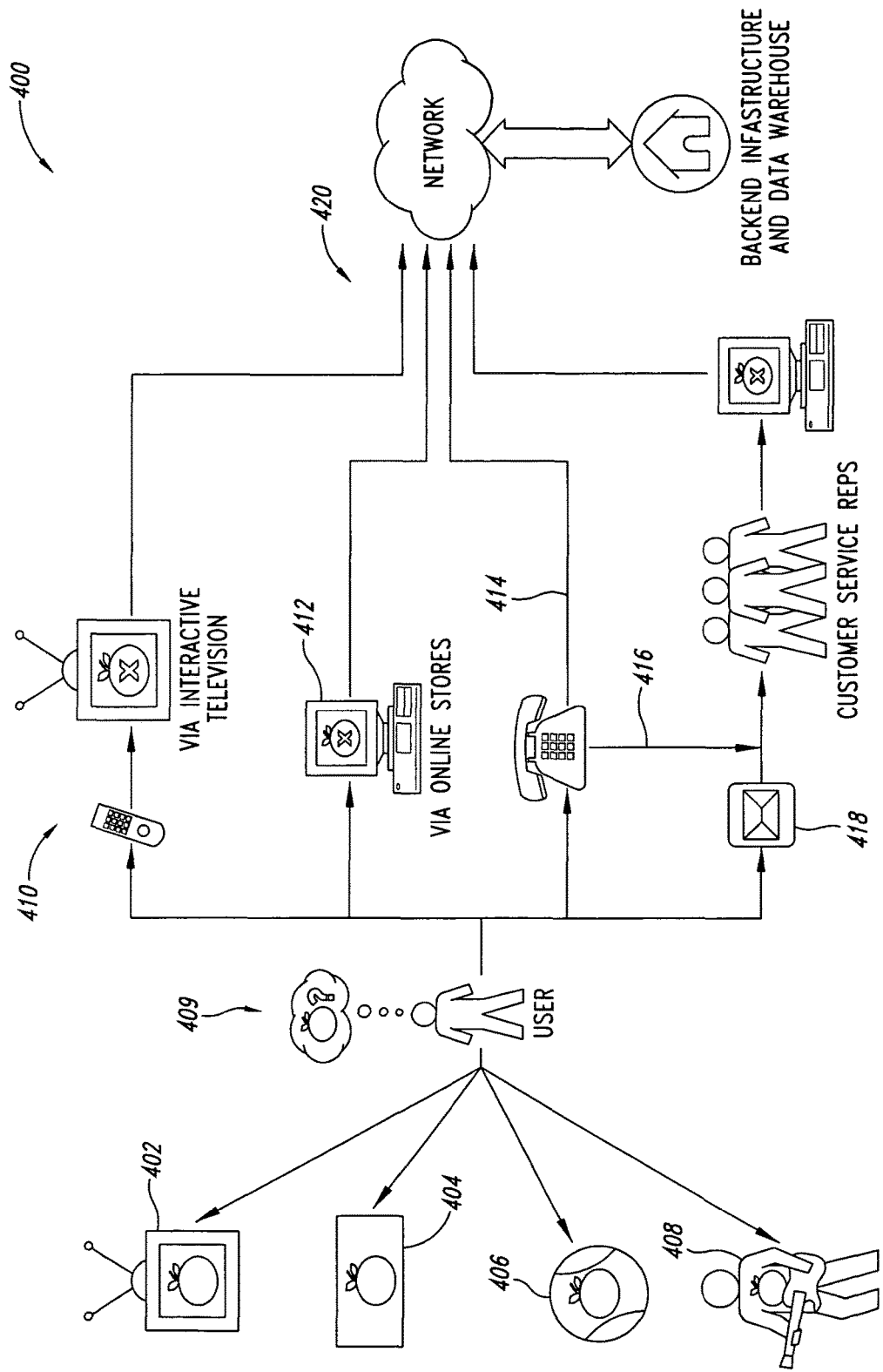
FIG. 7 is a flow diagram depicting an approach for presenting a product and placing an order according to series of possible embodiments.

In FIG. 7 product presentation occurs 400. This is when the execution of the presentation data assigned to the presentation-product data set comes to pass, and the presentation-product connection occurs. This presentation can occur across many possible media; including, but not limited to: being seen or heard in a television show (for example, Cheers), televised event (for example, Macy's Thanksgiving Day parade), television commercial, or recorded media played in a playback device connected to a television (for example, a digital video disc recording of "Titanic") 402; being seen or heard in a feature (for example, "Million Dollar Baby"), documentary (for example, "Fahrenheit 9-1-1"), or short film 404; or being seen, heard, smelled, or touched in a live in-person sporting (for example the Superbowl in Miami) 406, theatrical (for example, "The Producers" on Broadway in New York City), or musical event (for example, the Dave Matthews Band at Shoreline Amphitheater in Mountain View, Calif.) 408. At this point the user becomes aware of both the presentation and product, and remembers this connection, deciding to research this presentation-product connection 409. In most cases, the user's awareness of the product and presentation will be incomplete—for example, the user will not know the brand of the product, or will not remember the specific segment of the presentation in which it appeared. The user's awareness is a function of his/her own knowledge as well as the obviousness of the presentation-product connection. The user can have several choices available via which (s)he can research the presentation-product connection. The user can press buttons on a remote control and interact directly with interactive television applications decoded and displayed by a set-top box associated with a cable or satellite operator 410, whether the application is superimposed over video or resides on a dedicated interactive shopping channel; the user can conduct this research online using a computer which is part of a networked computer environment 412; the user can conduct this research by telephone and interact with an automated voice-activated system 414; the user can conduct this research by telephone and speak directly with a human customer service representative 416; the user can send a letter via standard post or courier service to a human customer service representative 418 who can then answer or facilitate inquiries, purchases, and/or referrals of the correlated presentation and product using a computer which is part of a networked environment of computers 420. If the research inquiry yields a product opportunity, and a monetary transaction and/or order is to be shipped, the order is fulfilled as in 100. The research inquiry may be satisfied without a purchase or request for information. In either case (whether or not a transaction occurs) response data are gathered and used in reports as in 116. Thus multiple means by which the user can experience the presentation-product connection, and multiple means by which the user can research this connection are depicted.

Figure 8:
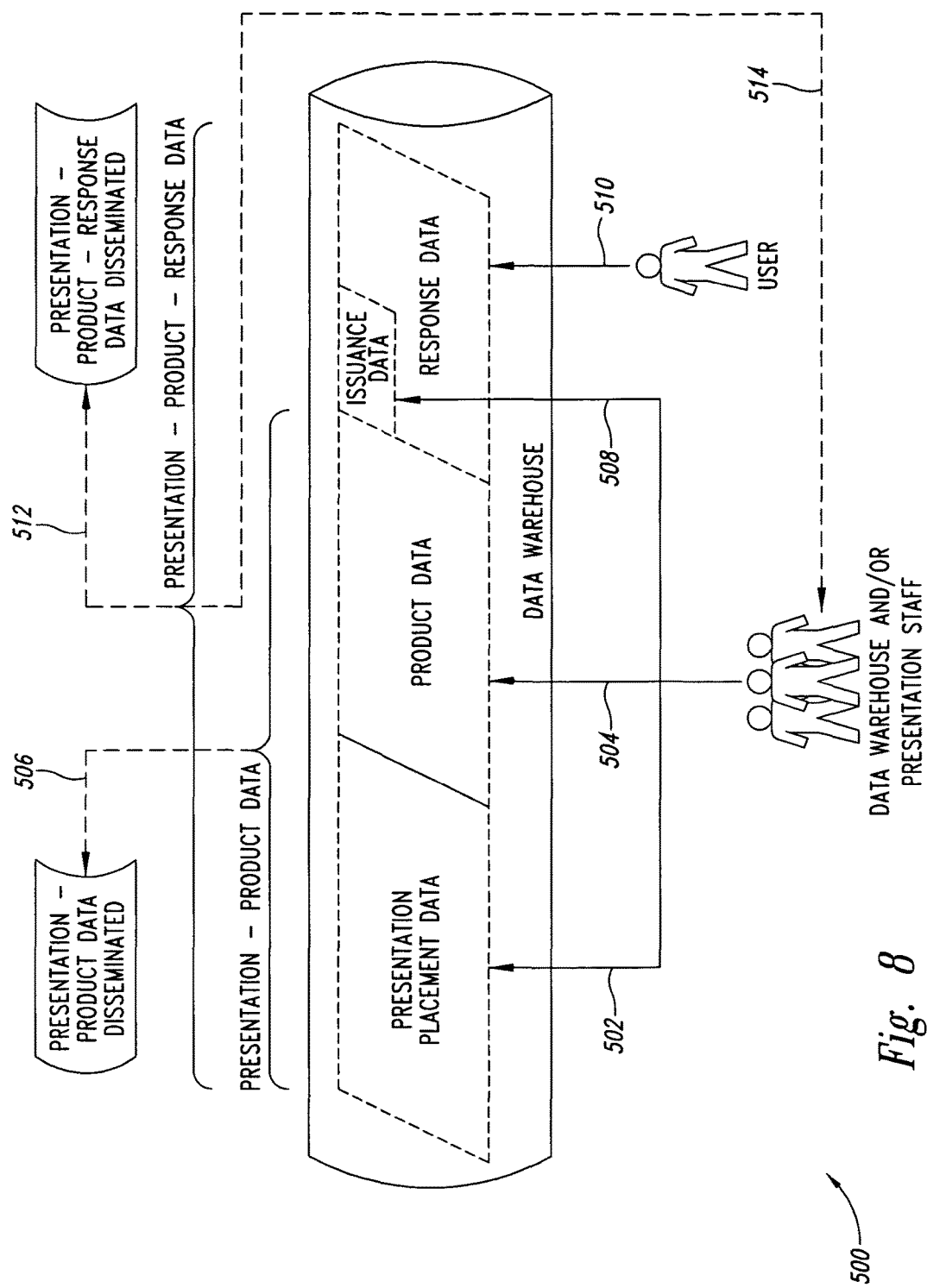
FIG. 8 is a diagram depicting an approach for aggregating and disseminating data according to an embodiment.

In FIG. 8 data warehouse staff and/or presentation staff input presentation placement data 502 into a data warehouse. They also input product data 504. The combination of presentation and product data can then be disseminated to association members 506. In parallel, the presentation-product data can be issued as product opportunities. These opportunities can be either immediately issued, or scheduled for future issuance. This issuance data is also stored in the data warehouse 508. The presentation-product data disseminated in 506 may, in some cases, include issuance data 508, but the presentation-product data will not include response data. Issuance data may be requested 506 in cases where association members wish to reserve the right to provide existing product opportunities as documented in issuance data to users on its own terms—i.e. optionally. It is expected that in some cases association members will in fact issue the presentation-product data themselves using their own means, in which case issuance data as input by presentation and/or data warehouse staff will not be necessary. Similarly, in some cases it is expected that association members will have already issued product opportunities for a product described in the presentation-product data prior to receipt of the presentation-product data. For example, an association member paying a subscription fee for thousands of presentation-product connections may decide on a connection-by-connection basis whether to include the issuance data as part of the presentation-product connection data; a decision which, for example, may be based on whether or not the subscription customer already issues product opportunities for the same product, but is simply lacking the presentation component of the presentation-product connection data set in its issuance of the product opportunity. For example, if toysrus.com carries a "Sara doll" but not a "Mary doll", and toysrus.com, as a subscription association customer of presentation-product data learns that both were featured in "Full House", toysrus.com may wish to include the issuance data provided in the presentation-product data in its product opportunity for the "Mary doll", but may decide to not include the issuance data provided as part of the presentation-product data for the "Sara doll" since toysrus.com had independently issued this product opportunity prior to receipt of the presentation-product data.

The terms of the subscription service joined by the association member will determine whether or not issuance data is included with presentation-product data 506.

Once presentation-product data has been issued by presentation and/or data warehouse staff, it exists as a product opportunity for users. Prior to interaction, a product opportunity is potentially available to any individual or organization using the technological media (for example, all users online), or physically in close proximity to the live location (all residents of Mountain View, Calif.), of the presentation described in the presentation-product data. Individuals or organizations who in fact interact with the product opportunity are "users" of the issued presentation-product data (for example, online users who access the online location of the product opportunity, or attendees of the Dave Matthews concert at the Shoreline Amphitheater in Mountain View, Calif.), and at the point of initial interaction or in subsequent research begin to generate response data through navigation decisions in a computer, Interactive Voice Response system, verbal conversation over the telephone, or by sending a written letter which comprises an inquiry, purchase, or referral 510. Either in real-time as permitted, or after the conclusion of the user's interaction, response data is collected and submitted to the data warehouse 510, and subsequently made available as presentation-product-response data in the form of transactions, reports, or aggregated usage data which is provided to association members, third party order fulfillment partners, or clients 512. If the user's inquiry results in a monetary transaction and/or order to be shipped, the order is fulfilled as in 100. The inquiry may be satisfied without a purchase or request for information. The resultant presentation-product-response data is also used by data warehouse staff and/or presentation staff to evaluate the success of the presentation-product issuance, both in terms of the issuance as well as the presentation-product connection itself. This data is thus also used by data warehouse staff and/or presentation staff to assist in planning future presentation-product connections 514. Modes of analysis of presentation-product-response data for future planning assess exposure, opportunity, interaction, inquiry, sales, and correlated research data. Correlated research data could include demographic data appends (as available), survey data, and customer service input. Two other analysis examples include category analysis (e.g. which types of products are successful with which types of presentations), and Return On Investment analysis (return on investment as calculated by sales of issued product opportunities or by sales of similar product opportunities issued by 3rd party merchants compared to the cost of presenting the product).

Figure 9:
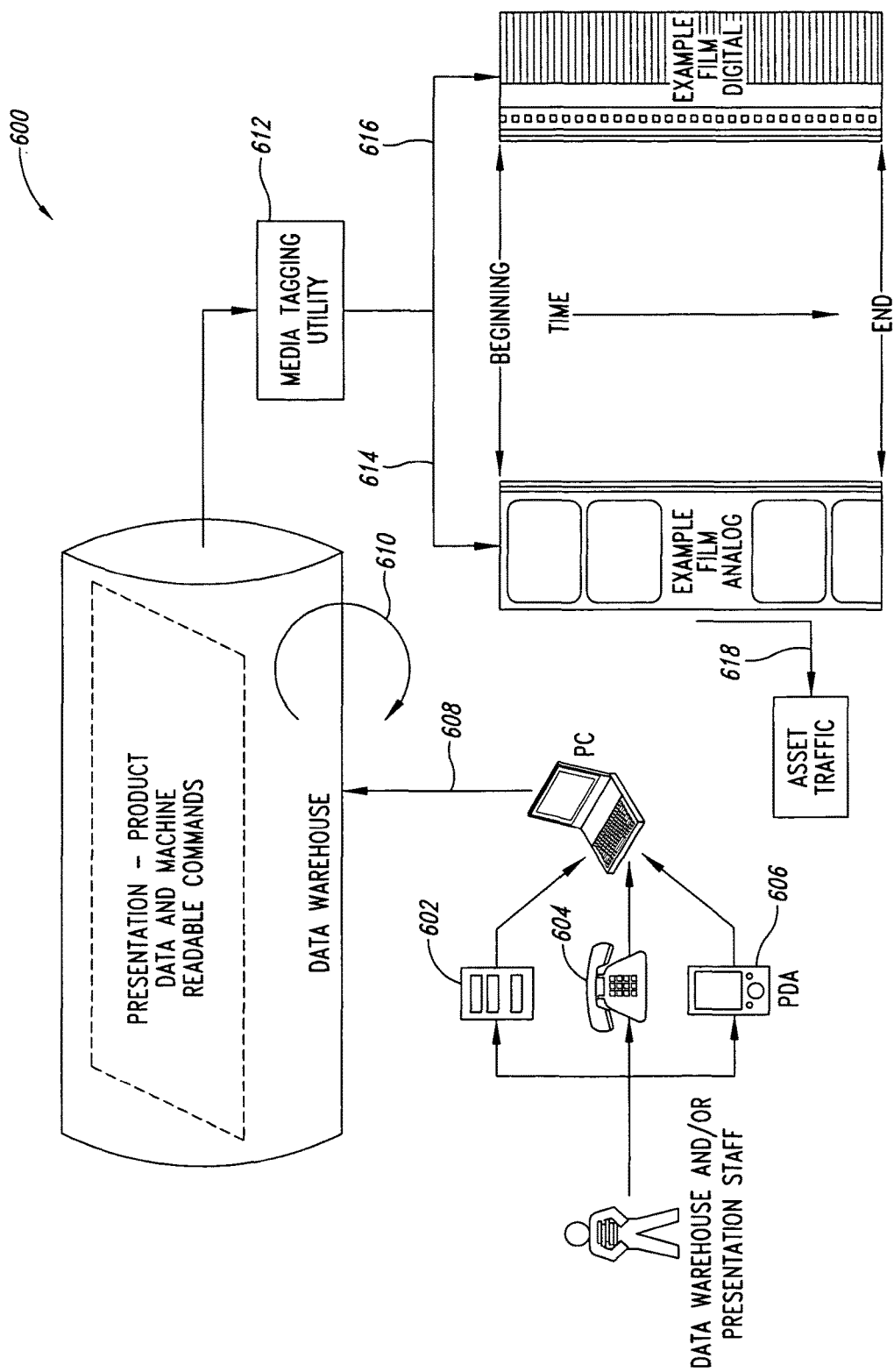
FIG. 9 is a flow diagram depicting an approach for aggregating and disseminating data according to an embodiment in which the dissemination occurs within the presentation described by the data.

In FIG. 9 presentation placement data is manipulated and transformed to be more efficient for issuance and analysis purposes 600. Presentation and/or data warehouse staff input presentation placement data as well as product data into the data warehouse. This product data may or may not also include issuance data. Further, presentation and/or data warehouse staff input machine readable commands which may include machine readable commands intended for the decode and display device used to display the entertainment or news presentation described in the presentation-product data, or which may include program instructions intended for an external device or machine. As appropriate, presentation and/or data warehouse staff execute commands via online form 602, Interactive Voice Response system 604, or Personal Digital Assistant 606 which are received at the data warehouse 608 and initiate data tagging algorithms which define relationships between presentation-product attributes and apply meta-data structures to the presentation-product data 610. Meta-data is data about data, which is to say, a system of tagging data using descriptors not directly explicit to the information presented in the data itself but which can be used to tie the datum it classifies to other like data similarly classified in other presentation-product connections. Meta-data implies a hierarchical relationship between descriptor and datum. For example, in this presentation-product connection presentation staff submit the following—"'Sara doll' appears in 'Full House' scene where Michelle's feelings are hurt by her friend"—meta-data is assigned to each component of the connection—so "Sara Doll" is tagged as "Product", "Full House" is tagged as "Program", "sad" is tagged as "Emotion", and "Michelle" is tagged as "character". Subsequently, data warehouse staff adds this data and meta-data to the presentation-product connection: "Mattel" is tagged as "Brand", buytoys.com is tagged as "Issuance", "scene 4: the argument" is tagged as "Scene", and "Mary Kate Olsen" is tagged as "Actor". Thus in subsequent analysis 116 a list of all "Brands" associated with "Emotion=Sad" can be produced and will include "Mattel", or a list of "Products" associated with "Actor=Mary Kate Olsen" can be produced and will include "Sara Doll". By inserting data into a pre-defined structure, this process 610 renders the data more compatible for aggregation and subsequent dissemination.

One such implementation of this pre-defined structure for meta-data can be seen in FIGS. 1A-1B. In this structure, there are three hierarchical levels of data, with the lowest level including data alone (for example "Sara Doll"), the second level serving as meta-data for the first level (for example "Product Description") as well as data for the third level, which is meta-data for the second level (for example, "Product Data").

In another exemplary implementation meta-data is structured into a hierarchy based on relevance to association customer segments as well as technical implementations. In the exemplary implementation in FIGS. 10A-10B, meta-data classes are defined according to a hierarchical scheme in which presentation-product data is primary (Level 1) in order to yield product opportunities asynchronously—which is to say, in either a different medium than the one described in the presentation, and/or at a different time than the one described in the presentation data, inclusive of Level 1, 2, and 3 data as applicable. Level 1 meta-data is defined as data sufficient to identify the presentation, and data sufficient to distinguish the product from a competitor's product in the same product market. For example, if the doll shown in "Full House" was not obviously a "Sara doll", it must be identified as such in the Level 1 data such that it is obviously not, for example, a "Mary doll", which may be a similar product sold by a competitor to the producer of "Sara doll".

Visual frame location is secondary (Level 2) in the exemplary implementation in order to yield synchronous product opportunities—which is to say in the same medium, at the same time as the presentation described in the presentation-product data, and using meta-data attributes which are intelligible to the rendering engine utilized by the medium's display machine. For example, Level 2 meta-data in this scheme is assumed to be physically or logically inserted into the digital or analog film for a television program (assuming that the same device displaying the video can display the product opportunity), or streamed synchronously with the online asset described in the presentation-product data. The data itself will describe the presentation-product connection in technical terms intelligible to the rendering engine, so that, for example, these instructions can be forwarded to a television set-top-box's on-screen display mechanism, which can highlight the product described in the presentation-product data with, for example, a visual overlay. Media Content detail is tertiary (Level 3) in the meta-data structure described in FIGS. 10A-10B, as it expands on the presentation-product connection but is not critical to differentiate the product from a competitor's product in the same product market, nor does it add data critical for the highlight of the product by the set-top box's onscreen display, for example. Level 4 meta-data can be used to transform Level 1, 2, or 3 data into useful data structures for analysis 116. In Level 4 less emphasis is placed on the product, and more is placed on the presentation referred to in Level 1 data, and is intended to serve as a comprehensive technical meta-data structure for the cataloguing of the media asset described in the presentation data.

Level 5 meta-data, in the exemplary implementation depicted in FIGS. 10A-10B, represents a mapping structure through which comprehensive Level 4 data is normalized according to a published library of Media Industry Control Codes, and also a system for using the same tagging mechanism 600 to insert commands intended for use by external machines other than the machine decoding and displaying the entertainment or news presentation asset described in the presentation data. This is distinct from Level 2 data in the exemplary implementation described in FIGS. 10A-10B in that while Level 2 data is used to modify the delivery of the display mechanism of the entertainment or news presentation itself, for example by modifying a supplementary display mechanism in parallel with the presentation (for example, the on-screen display of a set-top box which is responsible for displaying overlay content in a semi-transparent manner with relationship to the video being displayed behind it), Level 5 data can be used to issue commands to external machines using a wireless or cabled transport mechanism. For example, a media control code could be embedded in a set of machine readable commands, in the exemplary implementation described in FIGS. 10A-10B, such that a media control code could be embedded in a set of machine readable commands every time a specific actor appears in a television show, the lights in the user's living room are dimmed 10%, and when the actor is no longer onscreen, the lights are brightened back to the previous level. In its relationship with other tiers of data in the exemplary implementation in FIGS. 10A-10B, Level 5 meta-data can be used in analysis 116 to research how embedded media control codes are used in reference to lower-level data, and also to issue and distribute associated commands across multiple media assets. For example, a media control code database could be used in the post-production of films and television programs such that a media control code could be embedded in a set of machine readable commands every time a specific actor appears onscreen in any film or television program, any nearby lights accessible via external interface to the primary display device are dimmed 10%.

In the exemplary implementation in FIGS. 10A-10B, once the presentation-product data and/or control code instruction data has been transformed and enhanced into the pre-defined structures of meta-data, it can be directly disseminated into a media tagging utility 612 which encodes or inserts this data into analog 614 or digital 616 video media assets adhering to industry standards for this encoding and its subsequent dissemination transport (e.g. Application Protocol Data Unit, Open Source Initiative, Moving Picture Experts Group, Society of Motion Picture and Television Engineers time code, Open Cable, Multimedia Home Plafform, Advanced Television Enhancement Forum). The meta-data defines a fixed location for the presentation-product data to be inserted into by the tagging tool, although the location can be rendered dynamically by the media tagging tool as the need for compression in the finite space available arises.

These presentation assets are then trafficked or distributed to the presentation entities responsible for disseminating them to consumers, subscribers, or viewers 618. This media tagging utility is either a stand-alone Personal Computer application or a plug-in to other industry standard media processing applications, and inserts meta-data which is tightly synchronized to the media presentation—for example data which identifies the specific location within the media video frame itself where a product is displayed.

Figure 11:
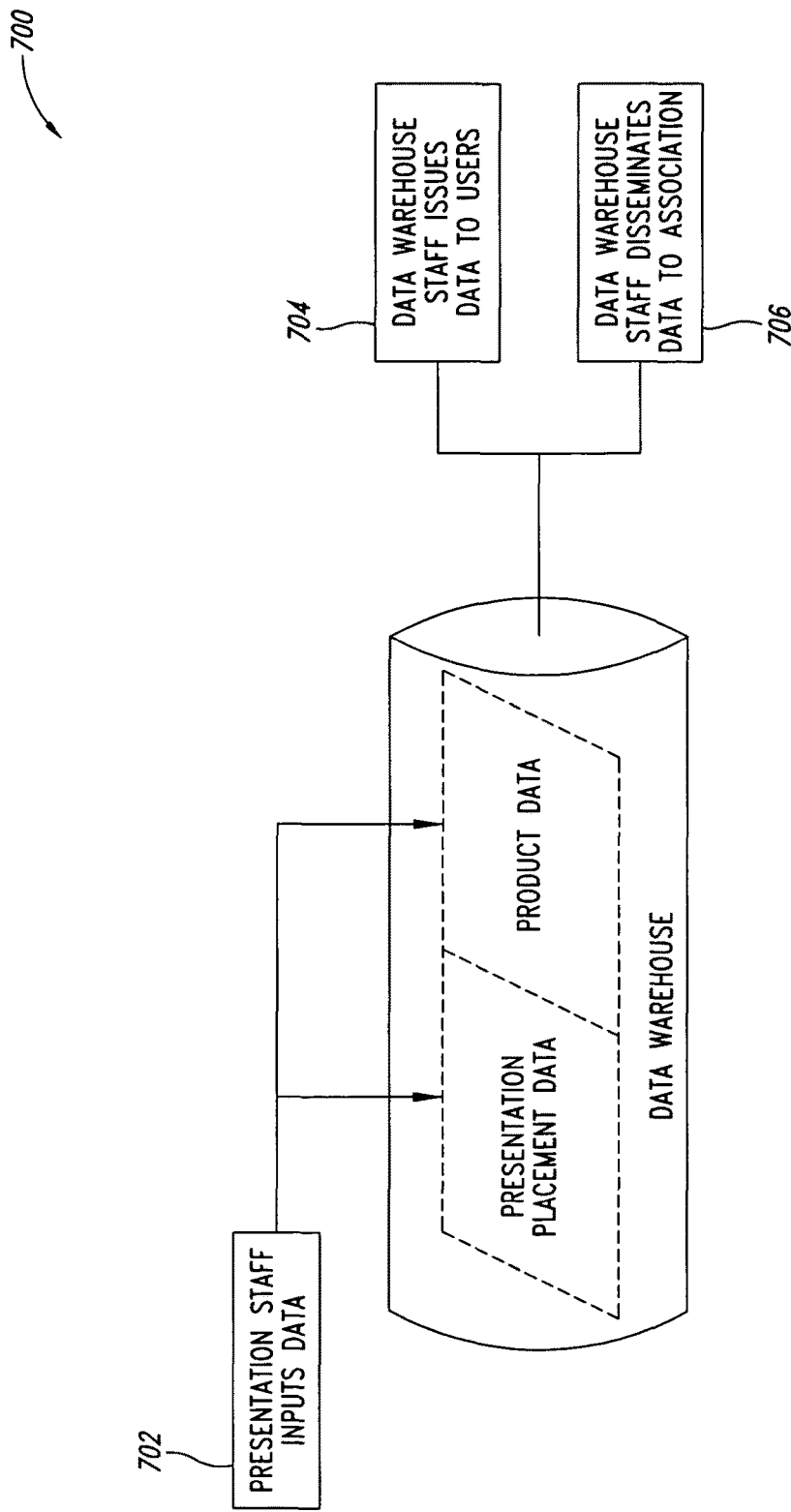
FIG. 11 is a flow diagram depicting an approach for aggregating and disseminating data according to an embodiment in which presentation producers initially input presentation placement data.

In FIG. 11 presentation staff input all presentation placement data and product data, which is stored in a data warehouse 702. Data warehouse staff subsequently issue this presentation-product data to users as product opportunities 704, and/or disseminate the presentation-product data to association members.

Figure 12:
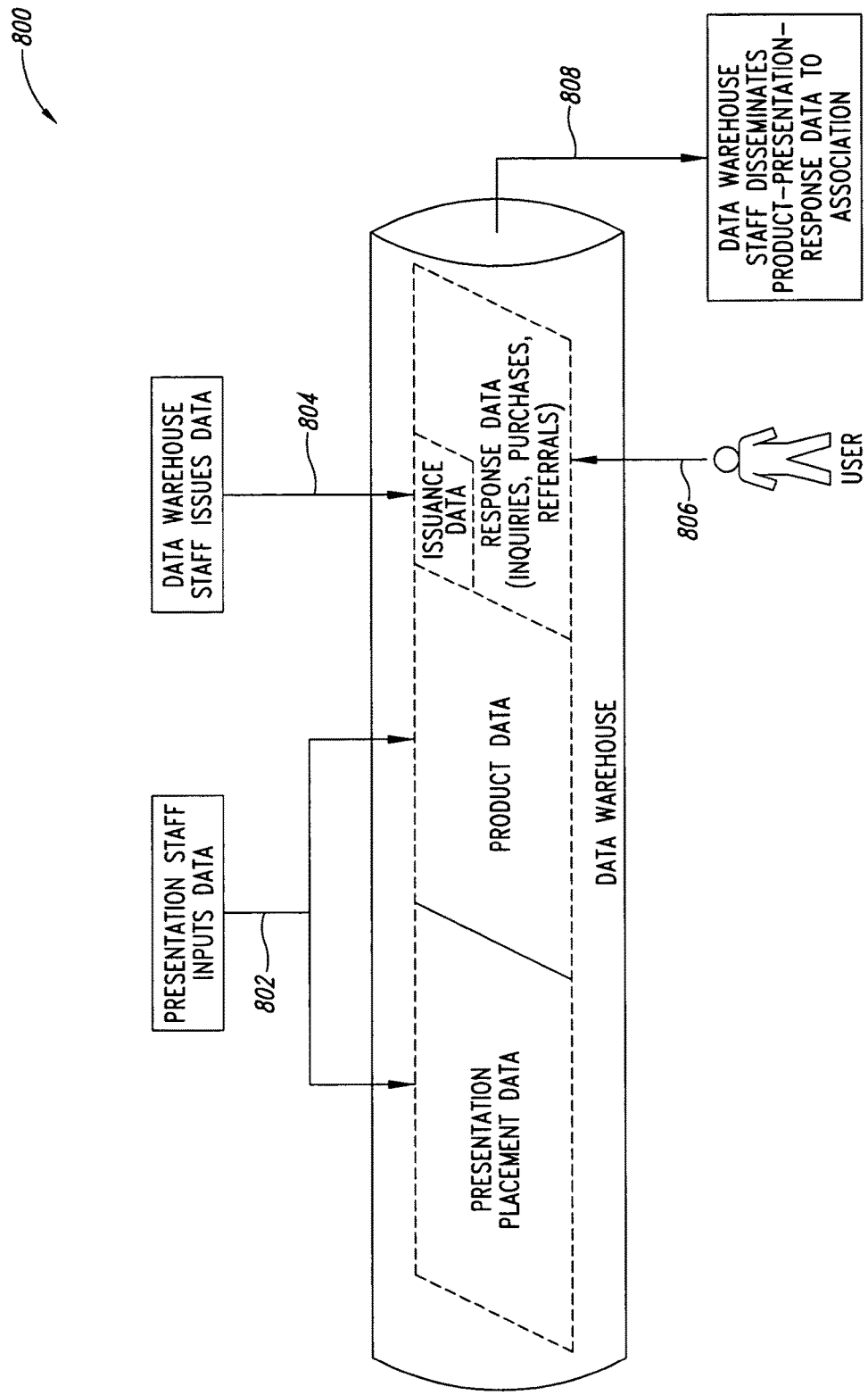
FIG. 12 is a flow diagram depicting an approach for aggregating and disseminating data, and for placing and receiving an order according to an embodiment in which presentation producers initially input presentation placement data.

In FIG. 12 presentation staff input all presentation placement data and product data, which is stored in a data warehouse 802. Data warehouse staff subsequently issue this presentation-product data to users as product opportunities, and input issuance data into the data warehouse 804. Users interact with product opportunities and in some cases make inquiries, referrals, and/or purchases, which are fulfilled 100. The resulting presentation-product-response data is disseminated in the form of transactions, reports, or aggregated usage data which is provided to association members 808.

In FIG. 13 data warehouse staff input presentation placement instructions 902, which must be stored and rendered accessible to presentation staff prior to the chronological occurrence of the presentation they describe. Similarly, the data warehouse staff inputs product data to complete the presentation-product data input into the data warehouse 902. Presentation staff then accesses the data warehouse and retrieve the presentation placement instructions as well as the product data, which constitute the presentation-product data 904. Next, presentation staff fulfills the presentation placement instructions by placing the product in the presentation according to the specified instructions 906, ensuring that at the time of the presentation occurrence described by the presentation instructions, the presentation-product data will be validated by the fact that the product is seen, heard, mentioned, smelled, or felt as per the presentation placement instructions.

In FIG. 14 data warehouse staff input presentation placement instructions 1002, which must be stored and rendered accessible to presentation staff prior to the chronological occurrence of the presentation they describe. Similarly, the data warehouse staff inputs product data to complete the presentation-product data input into the data warehouse 1002. Presentation staff then accesses the data warehouse and retrieve the presentation placement instructions as well as the product data, which constitute the presentation-product data, and then presentation staff fulfill the presentation placement instructions by placing the product in the presentation according to the specified instructions 1004. Data warehouse staff subsequently issue this presentation-product data to users as product opportunities 1006, and input issuance data into the data warehouse. Users interact with product opportunities and in some cases make inquiries, referrals, and/or purchases 1008, which are fulfilled 100. The resulting presentation-product-response data is disseminated by data warehouse staff in the form of transactions, reports, or aggregated usage data which is provided to association members 1010.

In FIG. 15 presentation staff input all presentation placement data and all product data 1102. Furthermore, presentation staff also issues the presentation-product data as product opportunities, and input the issuance data in the data warehouse 1104. Users interact with product opportunities and in some cases make inquiries, referrals, and/or purchases 1106, which are fulfilled 100. The resulting presentation-product-response data is disseminated by presentation staff in the form of transactions, reports, or aggregated usage data which is provided to association members 1108. This embodiment 1100 represents a self-service module which can be implemented as a software module for use in computers in a networked computer environment, and is intended for use by presentation staff.

The foregoing detailed description has set forth various embodiments of the devices and/or processes via the use of block diagrams, flowcharts, and examples. Insofar as such block diagrams, flowcharts, and examples contain one or more functions and/or operations, it will be understood that each function and/or operation within such block diagrams, flowcharts, or examples can be implemented, individually and/or collectively, by a wide range of hardware, software, firmware, or virtually any combination thereof.

However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links (e.g., packet links).

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for efficiently purchasing at least one product opportunity with regard to specified presentation and product data, said method comprising:

hosting an electronic database by a backend computer system, said electronic database being stored on a non-transitory computer-readable medium of said backend computer system and of said backend computer system and comprising presentation data regarding presentations containing an involvement of at least one unadvertised product, product data and an association between said presentation data and said product data, and purchase information for said products, wherein said presentations are not dependent on a manner of distribution of said presentations including not being dependent on Internet based delivery of said presentations;

transforming the presentation and product data into a meta-data structure using the association between said presentation data and said product data;

encoding meta-data from the meta-data structure for the presentation and the product data into a video;

receiving at said backend computer system a request from a requester for product opportunities related to said specified presentation and product data that was displayed in a video presentation of the video using the meta-data, said specified presentation and product data being part of said request for product opportunities, and said presentation and product data describing an involvement of a product in the video presentation;

querying by said backend computer system said electronic database hosted by said backend computing system based on said specified presentation product data;

transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;

disseminating by said backend computer system said list of said at least one product opportunity tied to other similarly classified presentation and product data but not explicitly tied to said specified presentation and product data of said request for product opportunities;

receiving at said backend computer system a buy request for said at least one product opportunity tied to other similarly classified presentation and product data but not explicitly tied to said specified presentation and product data of said request for product opportunities from said requester; and processing at said backend computer system said buy request from said requester.

2. The method of claim 1 wherein said product appearance data describes displays of said products in said presentations.

3. The method of claim 1 wherein said product appearance data describes verbal mention of said products without display presence of said products during said presentation.

4. The method of claim 1, wherein said presentations are at least one of a group chosen from: a television program, and a movie shown in a movie theater.

5. A method for efficiently identifying at least one product opportunity with regard to specified presentation and product data, said method comprising:

hosting an electronic database by a backend computer system, said electronic database being stored on a non-transitory computer-readable medium of said backend computer system and comprising presentation data regarding presentations containing an involvement of at least one unadvertised product, product data and an association between said presentation data and said product data, wherein said presentations are not dependent on a manner of distribution of said presentations including not being dependent on Internet based delivery of said presentations;

transforming the presentation and product data into a meta-data structure using the association between said presentation data and said product data;

encoding meta-data from the meta-data structure for the presentation and the product data into a video;

initiating a request for product opportunities on a requester input device;

receiving at said backend computer system said request from said requester for product opportunities related to said specified presentation and product data that was displayed in a video presentation of the video using the meta-data, said specified presentation and product data being part of said request for product opportunities, and said presentation and product data describing an involvement of a product in the video presentation;

querying by said backend computer system said electronic database hosted by said backend computing system based on said specified presentation product data;

transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and disseminating by said backend computer system said list of said at least one product opportunity tied to other similarly classified presentation and product data but not explicitly tied to said specified presentation and product data of said request for product opportunities.

6. A method for efficiently aggregating a list of at least one product opportunity regarding specified presentation and product data, said method comprising:

hosting an electronic database by a backend computer system, said electronic database being stored on a non-transitory computer-readable medium of said backend computer system and comprising presentation data regarding presentations containing an involvement of at least one unadvertised product, product data and an association between said presentation data and said product data, wherein said presentations are not dependent on a manner of distribution of said presentations including not being dependent on Internet based delivery of said presentations;

transforming the presentation and product data into a meta-data structure using the association between said presentation data and said product data;

encoding meta-data from the meta-data structure for the presentation and the product data into a video;

receiving at said backend computer system a request from a requester for product opportunities related to said specified presentation and product data that was displayed in a video presentation of the video using the meta-data, said specified presentation and product data being part of said request for product opportunities, and said presentation and product data describing an involvement of a product in the video presentation;

querying by said backend computer system said electronic database hosted by said backend computing system based on said specified presentation product data;

transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and disseminating by said backend computer system said list of said at least one product opportunity tied to other similarly classified presentation and product data but not explicitly tied to said specified presentation and product data of said request for product opportunities.

7. The method of claim 6, wherein said presentation data is added to said electronic database before preparation of said presentations.

8. The method of claim 6, wherein said presentation data is added to said electronic database after preparation of said presentations.

9. The method of claim 6, wherein a portion of said presentation data in said electronic database is inputted into said electronic database using at least one of a group chosen from: an online form, an online file upload, a Personal Computer (PC), a Personal Digital Assistant, a tablet computer, and a telephone with an Interactive Voice Response system.

10. The method of claim 6, wherein said presentation data in said electronic database includes presentation preparation instructions.

11. The method of claim 6, further comprising adding issuance data to said electronic database.

12. The method of claim 11, wherein said issuance data describes how said list of at least one product opportunity is made available to said requester.

13. The method of claim 11, wherein said issuance data contains instructions for a display mechanism of said requester to show said list of at least one product opportunity as an overlay on a display mechanism of said requester, and further comprising disseminating said issuance data with said list of at least one product opportunity such that said instructions for a display mechanism cause said display mechanism of said requester to display said list of at least one product opportunity in on overlay on said display mechanism of said requester.

14. The method of claim 6 further comprising initiating said request for product opportunities on a requester input device.

15. The method of claim 14 wherein said requester input device is at least one of a group chosen from: a remote control interacting directly with an interactive television application, a computer, an internet connected computing device, a Personal Digital Assistant, and a telephone with an automated voice-activated response system.

16. The method of claim 6 wherein said backend computer system is interconnected with a computer network and said receipt of said request for product opportunities, and said dissemination of said at least one product opportunity, is received from, and disseminated to, said requester over said computer network.

17. The method of claim 6 wherein said presentation data describes when, where, how, and/or why products appear in presentations and wherein said product data describes products appearing in presentations.

18. The method of claim 6 wherein said electronic database further comprises response data that describes characteristics of said requester and said method of claim 6 further comprises adjusting by said electronic database hosted on said backend computer system said list of at least one product opportunity such that said list of at least one product opportunity targets characteristics of said response data of said requester.

19. The method of claim 18 wherein said response data describes where, when and how said requester interacts with presentation and product data.

20. The method of claim 18 wherein said characteristics of said requester are at least one of a group chosen from: location of requester, interests of requester, presentation viewing history of said requester, purchase history of said requester, and profile details of said requester.

21. The method of claim 18 further comprising:
tracking by said electronic database presentation and product data of said requester; and
storing by said electronic database said tracked presentation and product data of said requester in said electronic database.

22. The computer-readable medium of claim 18 wherein said characteristics of said requester are at least one of a group chosen from: location of requester, interests of requester, presentation viewing history of said requester, purchase history of said requester, and profile details of said requester.

23. The method of claim 6 further comprising offering said list of said at least one product opportunity for sale.

24. The method of claim 6 further comprising:
defining automatically by said backend computer system relationships between presentation data and product data when said presentation data and said product data is added to said electronic database; and
applying automatically by said backend computer system and said electronic database hosted on said backend computer system meta-data structure to said presentation data and said product data added to said electronic database.

25. The method of claim 6 wherein said presentation data is configured such that involvement of said product is at least one of a group chosen from: use of said product in a portion of said presentation, and verbal mention of said product in said presentation.

26. A method for efficiently aggregating a list of at least one product opportunity regarding specified presentation and product data, said method comprising:
hosting an electronic database by a backend computer system, said electronic database being stored on a non-transitory computer-readable medium of said backend computer system and comprising presentation data regarding presentations containing an involvement of at least one unadvertised product, said presentation data including meta-data, and product data including meta-data, wherein said presentations are not dependent on a manner of distribution of said presentations including not being dependent on Internet based delivery of said presentations;
transforming the presentation and product data into a meta-data structure using the association between said presentation data and said product data;
encoding meta-data from the meta-data structure for the presentation and the product data into a video;
receiving at said backend computer system a request from a requester for product opportunities related to said specified presentation and product data that was displayed in a video presentation of the video using the meta-data, said specified presentation and product data being part of said request for product opportunities, and said presentation and product data describing an involvement of a product in the video presentation;
querying by said backend computer system said electronic database hosted by said backend computing system based on said specified presentation product data;
transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and
disseminating by said backend computer system said list of said at least one product opportunity tied to other similarly classified presentation and product data but not explicitly tied to said specified presentation and product data of said request for product opportunities.

27. The method of claim 26 further comprising:
identifying by said requester said specified presentation and product data for said video media presentation based upon said meta-data encoded into said video as said specified presentation and product data.

28. The method of claim 26 wherein said processes of querying said electronic database for said specified presentation and product data is based upon said meta-data.

29. The method of claim 26 wherein said meta-data has a hierarchical relationship permitting descriptors not directly tied to other data to be tied to similarly classified data.

30. A method for efficiently aggregating a list of at least one product opportunity as well as controlling a requesting device regarding specified presentation and product data, said method comprising:
- hosting an electronic database by a backend computer system, said electronic database being stored on a non-transitory computer-readable medium comprising presentation data regarding presentations containing an involvement of an unadvertised product, product data, command data for said requesting device, and an association between said presentation data and said command data, wherein said presentations are not dependent on a manner of distribution of said presentations including not being dependent on Internet based delivery of said presentations;
- transforming the presentation and product data, into a meta-data structure using the association between said presentation data and said product data;
- encoding meta-data from the meta-data structure for the presentation and the product data into a video;
- receiving at said backend computer system said request from a requester for product opportunities related to said specified presentation and product data that was displayed in a video presentation of the video using the meta-data, said specified presentation and product data being part of said request for product opportunities, and said presentation and product data describing an involvement of a product in the video presentation;
- querying by said backend computer system said electronic database hosted by said backend computing system based on said specified presentation product data;
- transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;
- disseminating by said backend computer system said list of said at least one product opportunity tied to other similarly classified presentation and product data but not explicitly tied to said specified presentation and product data of said request for product opportunities; and
- issuing by said backend computer system command data configured to control said requesting device based at least in part upon said presentation data.

31. A method for efficiently aggregating a list of at least one product opportunity as well as controlling a requesting device regarding specified presentation and product data, said method comprising:
- hosting an electronic database by a backend computer system, said electronic database being stored on a non-transitory computer-readable medium comprising presentation data regarding presentations containing an involvement of an unadvertised product, product data, command data for said requesting device, and an association between said product data and said command data, wherein said presentations are not dependent on a manner of distribution of said presentations including not being dependent on Internet based delivery of said presentations;
- transforming the presentation and product data into a meta-data structure using the association between said presentation data and said product data;
- encoding meta-data from the meta-data structure for the presentation and the product data into a video;
- receiving at said backend computer system said request from a requester for product opportunities related to said specified presentation and product data that was displayed in a video presentation of the video using the meta-data, said specified presentation and product data being part of said request for product opportunities, and said presentation and product data describing an involvement of a product in the video a-presentation;
- querying by said backend computer system said electronic database hosted by said backend computing system based on said specified presentation product data;
- transforming by said electronic database hosted by said backend computer system said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;
- disseminating by said backend computer system said list of said at least one product opportunity tied to other similarly classified presentation and product data but not explicitly tied to said specified presentation and product data of said request for product opportunities; and
- issuing by said backend computer system command data configured to control said requesting device based at least in part upon said product data.

32. A system for efficiently purchasing at least one product opportunity with regard to specified presentation and product data, said system comprising:
- a backend computer system that transforms the presentation and product data into a meta-data structure using the association between said presentation data and said product data, encodes meta-data from the meta-data structure for the presentation and the product data into a video, receives a request from a requester for product opportunities related to said specified presentation and product data that was displayed in a video presentation of the video using the meta-data, said specified presentation and product data being part of said request for product opportunities, and said presentation and product data describing an involvement of a product in the video presentation, queries an electronic database hosted by said backend computing system based on said specified presentation product data, disseminates a list of at least one product opportunity tied to other similarly classified presentation and product data but not explicitly tied to said specified presentation and product data of said request for product opportunities produced by said electronic database, receives a buy request for said at least one product opportunity tied to other similarly classified presentation and product data but not explicitly tied to said specified presentation and product data of said request for product opportunities from said requester, and processes said buy request from said requester; and said electronic database that is hosted by said backend computer system, is stored on a non-transitory computer-readable medium of said backend computer system, that comprises presentation data regarding presentations containing an involvement of at least one unadvertised product, product data and an association between said presentation data and said product data and purchase information for said products wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

33. The system of claim 32 wherein said product appearance data describes displays of said products in said presentations.

34. The system of claim 32 wherein said product appearance data describes verbal mention of said products without display presence of said products during said presentation.

35. The system of claim 32, wherein said presentations are at least one of a group chosen from: a television program, and a movie shown in a movie theater.

36. A system for efficiently identifying at least one product opportunity with regard to specified presentation and product data, said system comprising:

a requester input device that initiates a request for product opportunities;

a backend computer system that transforms the presentation and product data into a meta-data structure using the association between said presentation data and said product data, encodes meta-data from the meta-data structure for the presentation and the product data into a video receives said request from said requester for product opportunities related to said specified presentation and product data that was displayed in a video presentation of the video using the meta-data, said specified presentation and product data being part of said request for product opportunities, and said presentation and product data describing an involvement of a product in the video presentation, queries an electronic database hosted by said backend computing system based on said specified presentation product data, and disseminates a list of at least one product opportunity tied to other similarly classified presentation and product data but not explicitly tied to said specified presentation and product data of said request for product opportunities produced by said electronic database; and said electronic database that is hosted by said backend computer system, that is stored on a non-transitory computer-readable medium of said backend computer system, that comprises presentation data regarding presentations containing an involvement of at least one unadvertised product, product data and an association between said presentation data and said product data wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

37. A system for efficiently aggregating a list of at least one product opportunity regarding specified presentation and product data, said system comprising:

a backend computer system that transforms the presentation and product data into a meta-data structure using the association between said presentation data and said product data, encodes meta-data from the meta-data structure for the presentation and the product data into a video, receives a request from a requester for product opportunities related to said specified presentation and product data that was displayed in a video presentation of the video using, the meta-data, said specified presentation and product data being part of said request for product opportunities, and said presentation and product data describing an involvement of a product in the video presentation, queries an electronic database hosted by said backend computing system based on said specified presentation product data, and disseminates a list of at least one product opportunity tied to other similarly classified presentation and product data but not explicitly tied to said specified presentation and product data of said request for product opportunities produced by said electronic database; and said electronic database that is hosted by said backend computer system, that is stored on a non-transitory computer-readable medium of said backend computer system, that comprises presentation data regarding presentations containing involvement of at least one unadvertised product, product data, and an association between said presentation data and said product data wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

38. The system of claim 37, wherein said presentation data is added to said electronic database before preparation of said presentations.

39. The system of claim 37, wherein said presentation data is added to said electronic database after preparation of said presentations.

40. The system of claim 36, wherein said presentation data in said electronic database is inputted into said electronic database using at least one of a group chosen from: an online form, an online file upload, a Personal Computer (PC), a Personal Digital Assistant, a tablet computer, and a telephone with an Interactive Voice Response system.

41. The system of claim 37, wherein the presentation data in said electronic database includes presentation preparation instructions.

42. The system of claim 37 wherein said electronic database further comprises issuance data.

43. The system of claim 42 wherein issuance data describes how said list of at least one product opportunity is made available to said requester.

44. The system of claim 42 wherein said issuance data contains instructions for a display mechanism of said requester to show said list of at least one product opportunity as an overlay on a display mechanism of said requester, and further comprising disseminating said issuance data with said list of at least one product opportunity such that said instructions for a display mechanism cause said display mechanism of said requester to display said list of at least one product opportunity in on overlay on said display mechanism of said requester.

45. The system of claim 37 further comprising a requester input device that initiates said request for product opportunities.

46. The system of claim 45 wherein said requester input device is at least one of a group chosen from: a remote control interacting directly with an interactive television application, a computer, an internet connected computing device, a Personal Digital Assistant, and a telephone with an automated voice-activated response system.

47. The system of claim 37 further comprising a computer network interconnected with said backend computer system such that said receipt of said request for product opportunities, and said dissemination of said at least one product opportunity, is received from, and disseminated to, said requester over said computer network.

48. The system of claim 37 wherein said presentation data describes when, where, how, and/or why products appear in presentations and wherein said product data describes products appearing in presentations.

49. The system of claim 37 wherein said electronic database further comprises response data that describes characteristics of said requester and said electronic database further adjusts said list of at least one product opportunity such that said list of at least one product opportunity targets characteristics of said response data of said requester.

50. The system of claim 49, wherein said response data describes where, when and how said requester interacts with presentation and product data.

51. The system of claim 49 wherein said characteristics of said requester are at least one of a group chosen from: location of requester, interests of requester, presentation viewing history of said requester, purchase history of said requester, and profile details of said requester.

52. The system of claim 49 wherein said electronic database further tracks presentation and product data of said requester and stores said tracked presentation and product data of said requester.

53. The system of claim 37 wherein said list of said at least one product opportunity includes an offer to sell.

54. The system of claim 37 wherein said backend computer system further automatically defines system relationships between presentation data and product data when said presentation data and said product data is added to said electronic database and automatically applies meta-data structure to said presentation data and said product data added to said electronic database.

55. The system of claim 37 wherein said presentation data is configured such that involvement of said product is at least one of a group chosen from: use of said product in a portion of said presentation, and verbal mention of said product in said presentation.

56. A system for efficiently aggregating a list of at least one product opportunity regarding specified presentation and product data, said system comprising:
  a backend computer system that transforms the presentation and product data into a meta-data structure using the association between said presentation data and said product data, encodes meta-data from the meta-data structure for the presentation and the product data into a video, receives said request from a requester for product opportunities related to said specified presentation and product data that was displayed in a video presentation of the video using the meta-data, said specified presentation and product data being part of said request for product opportunities, and said presentation and product data describing an involvement of a product in the video presentation, queries an electronic database hosted by said backend computing system based on said specified presentation product data, and disseminates a list of at least one product opportunity tied to other similarly classified presentation and product data but not explicitly tied to said specified presentation and product data of said request for product opportunities produced by said electronic database; and
  said electronic database that is hosted by said backend computer system, that is stored on a non-transitory computer-readable medium, that comprises presentation data regarding presentations containing involvement of at least one unadvertised product, said presentation data including meta-data, and product data including meta-data wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

57. The system of claim 56 wherein said requester identifies said specified presentation and product data for said video media presentation based upon said meta-data encoded into said video media as said specified presentation and product data.

58. The system of claim 56 wherein said query of said backend computer system database searches said electronic database based upon said meta-data.

59. The system of claim 56 wherein said meta-data has a hierarchical relationship permitting descriptors not directly tied to other data to be tied to similarly classified data.

60. A system for efficiently aggregating a list of at least one product opportunity as well as controlling a requesting device regarding specified presentation and product data, said system comprising:

a backend computer system that transforms the presentation and product data into a mat-data structure using the association between said presentation data and said product data, encodes meta-data from the meta-data structure for the presentation and the product data into a video, receives said request from a requester for product opportunities related to said specified presentation and product data that was displayed in a video presentation of the video using the meta-data, said specified presentation and product data being part of said request for product opportunities, and said presentation and product data describing an involvement of a product in the video presentation, queries an electronic database hosted by said backend computing system based on said specified presentation product data, disseminates a list of at least one product opportunity tied to other similarly classified presentation and product data but not explicitly tied to said specified presentation and product data of said request for product opportunities produced by said electronic database, and issues command data configured to control said requesting device based at least in part upon said presentation data; and said electronic database that is hosted by said backend computer system, that is stored on a non-transitory computer-readable medium of said backend computer system, that comprises presentation data regarding presentations containing involvement of at least one unadvertised product, product data, command data for said requesting device, and an association between said presentation data and said command data wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

61. A system for efficiently aggregating a list of at least one product opportunity as well as controlling a requesting device regarding specified presentation and product data, said system comprising:

a backend computer system that transforms the presentation and product data into a meta-data structure using the association between said presentation data and said product data, encodes meta-data from the meta-data structure for the presentation and the product data into a video, receives said request from a requester for product opportunities related to said specified presentation and product data that was displayed in a video presentation of the video using the meta-data, said specified presentation and product data being part of said request for product opportunities, and said presentation and product data describing an involvement of a product in the video presentation, queries an electronic database hosted by said backend computing system based on said specified presentation product data, disseminates a list of at least one product opportunity tied to other similarly classified presentation and product data but not explicitly tied to said specified presentation and product data of said request for product opportunities produced by said electronic database, and issues command data configured to control said requesting device based at least in part upon said product data; and said electronic database that is hosted by said backend computer system, that is stored on a non-transitory computer-readable medium of said backend computer system, that comprises presentation data regarding presentations containing involvement of at least one unadvertised product, product data, command data for said requesting device, and an association between said product data and said command data wherein said presentations are not dependent on a manner of distribution of said presentations including not being dependent on Internet based delivery of said presentations, and that transforms said specified presentation and product data of said request for product opportunities into said list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities.

62. A non-transitory computer-readable medium including program instructions for a method for efficiently purchasing at least one product opportunity with regard to specified presentation and product data, method comprising:

hosting an electronic database comprising presentation data regarding presentations containing an involvement of at least one unadvertised product, product data and an association between said presentation data and said product data, and purchase information for said products, wherein said presentations are not dependent on a manner of distribution of said presentations including not being dependent on Internet based delivery of said presentations;

transforming the presentation and product data into a meta-data structure using the association between said presentation data and said product data;

encoding meta-data from the meta-data structure for the presentation and the product data into a video;

receiving a request from a requester for product opportunities related to said specified presentation and product data that was displayed in a video presentation of the video using the meta-data, said specified presentation and product data being part of said request for product opportunities, and said presentation and product data describing an involvement of a product in the video presentation;

querying said electronic database based on said specified presentation product data;

transforming by said electronic database said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;

disseminating said list of said at least one product opportunity;
receiving a buy request for said at least one product opportunity from said requester; and
processing said buy request from said requester.

63. The computer-readable medium of claim 62 wherein said product appearance data describes displays of said products in said presentations.

64. The computer-readable medium of claim 62 wherein said product appearance data describes verbal mention of said products without display presence of said products during said presentation.

65. The computer-readable medium of claim 62 wherein said presentations are at least one of a group chosen from: a television program, and a movie shown in a movie theater.

66. A non-transitory computer-readable medium including program instructions for a method for efficiently identifying at least one product opportunity with regard to specified presentation and product data, said method comprising:
hosting an electronic database comprising presentation data regarding presentations containing an involvement of at least one unadvertised product, product data and an association between said presentation data and said product data, wherein said presentations are not dependent on a manner of distribution of said presentations including not being dependent on Internet based delivery of said presentations;
transforming the presentation and product data into a meta-data structure using the association between said presentation data and said product data;
encoding meta-data from the meta-data structure for the presentation and the product data into a video;
initiating a request for product opportunities from a requester device;
receiving said request from said requester for product opportunities related to said specified presentation and product data that was displayed in a video presentation of the video using the meta-data, said specified presentation and product data being part of said request for product opportunities, and said presentation and product data describing an involvement of a product in the video presentation;
querying said electronic database based on said specified presentation product data;
transforming by said electronic database said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and
disseminating said list of said at least one product opportunity.

67. A non-transitory computer-readable medium including program instructions for a method for efficiently aggregating a list of at least one product opportunity regarding specified presentation and product data, said method comprising:
hosting an electronic database comprising presentation data regarding presentations containing an involvement of at least one unadvertised product, product data and an association between said presentation data and said product data, wherein said presentations are not dependent on a manner of distribution of said presentations including not being dependent on Internet based delivery of said presentations;
transforming the presentation and product data into a meta-data structure using the association between said presentation data and said product data;
encoding meta-data from the meta-data structure for the presentation and the product data into a video;
receiving a request from a requester for product opportunities related to said specified presentation and product data that was displayed in a video presentation of the video using the meta-data, said specified presentation and product data being part of said request for product opportunities, and said presentation and product data describing an involvement of a product in the video a presentation;
querying said electronic database hosted based on said specified presentation product data;
transforming by said electronic database said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and
disseminating said list of said at least one product opportunity.

68. The computer-readable medium of claim 67, wherein said presentation data is added to said electronic database before preparation of said presentations.

69. The computer-readable medium of claim 67, wherein said presentation data is added to said electronic database after preparation of said presentations.

70. The computer-readable medium of claim 67, wherein a portion of said presentation data in said electronic database is inputted into said electronic database using at least one of a group chosen from: an online form, an online file upload, a Personal Computer (PC), a Personal Digital Assistant, a tablet computer, and a telephone with an Interactive Voice Response system.

71. The computer-readable medium of claim 67, wherein said presentation data in said electronic database includes presentation preparation instructions.

72. The computer-readable medium of claim 67, wherein said electronic database further comprises issuance data.

73. The computer-readable medium of claim 72 wherein said issuance data describes how said list of at least one product opportunity is made available to said requester.

74. The computer-readable medium of claim 72, wherein said issuance data contains instructions for a display mechanism of said requester to show said list of at least one product opportunity as an overlay on a display mechanism of said requester, and further comprising disseminating said issuance data with said list of at least one product opportunity such that said instructions for a display mechanism cause said display mechanism of said requester to display said list of at least one product opportunity in on overlay on said display mechanism of said requester.

75. The computer-readable medium of claim 67 wherein said request for product opportunities is initiated on a requester input device.

76. The computer-readable medium of claim 75 wherein said requester input device is at least one of a group chosen from: a remote control interacting directly with an interactive television application, a computer, an internet connected computing device, a Personal Digital Assistant, and a telephone with an automated voice-activated response system.

77. The computer-readable medium of claim 67, further comprising program instructions for:
   interconnecting with a computer network such that said receipt of said request for product opportunities, and said dissemination of said at least one product opportunity, is received from, and disseminated to, said requester over said computer network.

78. The computer-readable medium of claim 67 wherein said presentation data describes when, where, how, and/or why products appear in presentations and wherein said product data describes products appearing in presentations.

79. The computer-readable medium of claim 67 wherein said electronic database further comprises response data that describes characteristics of said requester and said computer-readable medium of claim 66 further comprises program instructions for adjusting by said electronic database hosted said list of at least one product opportunity such that said list of at least one product opportunity targets characteristics of said response data of said requester.

80. The computer-readable medium of claim 79 further comprising program instructions for:
   tracking presentation and product data of said requester; and
   storing said tracked presentation and product data of said requester in said electronic database.

81. The computer-readable medium of claim 79 wherein said response data describes where, when and how said requester interacts with presentation and product data.

82. The computer-readable medium of claim 67 further comprising program instructions for offering said list of said at least one product opportunity for sale.

83. The computer-readable medium of claim 67 further comprising program instructions for:
   defining automatically relationships between presentation data and product data when said presentation data and said product data is added to said electronic database; and
   applying automatically meta-data structure to said presentation data and said product data added to said electronic database.

84. The computer-readable medium of claim 67 wherein said presentation data is configured such that involvement of said product is at least one of a group chosen from: use of said product in a portion of said presentation and verbal mention of said product in said presentation.

85. A non-transitory computer-readable medium including program instructions for a method for efficiently aggregating a list of at least one product opportunity regarding specified presentation and product data, said method comprising:
   hosting an electronic database comprising presentation data regarding presentations containing involvement of at least one unadvertised product, said presentation data including meta-data, and product data including meta-data, wherein said presentations are not dependent on a manner of distribution of said presentations including not being dependent on Internet based delivery of said presentations;
   transforming the presentation and product data into a meta-data structure using the association between said presentation data and said product data;
   encoding meta-data from the meta-data structure for the presentation and the product data into a video;
   receiving a request from a requester for product opportunities related to said specified presentation and product data that was displayed in a video presentation of the video using the meta-data, said specified presentation and product data being part of said request for product opportunities, and said presentation and product data describing an involvement of a product in the video presentation;
   querying said electronic database based on said specified presentation product data;
   transforming said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities; and
   disseminating said list of said at least one product opportunity.

86. The computer-readable medium of claim 85 further comprising program instructions for:
   identifying said specified presentation and product data for said video media presentation based upon said meta-data encoded into said video media as said specified presentation and product data.

87. The computer-readable medium of claim 85 wherein said processes of querying said electronic database for said specified presentation and product data is based upon said meta-data.

88. The computer-readable medium of claim 85 wherein said meta-data has a hierarchical relationship permitting descriptors not directly tied to other data to be tied to similarly classified data.

89. A non-transitory computer-readable medium including program instructions for a method for efficiently aggregating a list of at least one product opportunity as well as controlling a requesting device regarding specified presentation and product data, said method comprising:
   hosting an electronic database comprising presentation data regarding presentations containing an involvement of at least one unadvertised product, product data, command data for said requesting device, and an association between said presentation data and said command data, wherein said presentations are not dependent on a manner of distribution of said presentations including not being dependent on Internet based delivery of said presentations;
   transforming the presentation and product data into a meta-data structure using the association between said presentation data and said product data;
   encoding meta-data from the meta-data structure for the presentation and the product data into a video;
   receiving said request from a requester for product opportunities related to said specified presentation and product data that was displayed in a video presentation of the video using the meta-data, said specified presentation and product data being part of said request for product opportunities, and said presentation and product data describing an involvement of a product in the video presentation;

querying said electronic database based on said specified presentation product data;

transforming said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;

disseminating said list of said at least one product opportunity; and issuing command data configured to control said requesting device based at least in part upon said presentation data.

90. A non-transitory computer-readable medium including program instructions for a method for efficiently aggregating a list of at least one product opportunity as well as controlling a requesting device regarding specified presentation and product data, said method comprising:

hosting an electronic database comprising presentation data regarding presentations containing an involvement of at least one unadvertised product, product data, command data for said requesting device, and an association between said product data and said command data, wherein said presentations are not dependent on a manner of distribution of said presentations including not being dependent on Internet based delivery of said presentations;

transforming the presentation and product data into a meta-data structure using the association between said presentation data and said product data;

encoding meta-data from the meta-data structure for the presentation and the product data into a video;

receiving said request from a requester for product opportunities related to said specified presentation and product data that was displayed in a video presentation of the video using the meta-data, said specified presentation and product data being part of said request for product opportunities, and said presentation and product data describing an involvement of a product in the video presentation;

querying said electronic database based on said specified presentation product data;

transforming said specified presentation and product data of said request for product opportunities into a list of at least one product opportunity tied to other similarly classified presentation and product data but not explicitly tied to said specified presentation and product data of said request for product opportunities as a function of attributes of said specified presentation and product data in order to efficiently provide said other similarly classified presentation and product data not explicitly tied to said specified presentation and product data of said request for product opportunities;

disseminating said list of said at least one product opportunity; and issuing command data configured to control said requesting device based at least in part upon said product data.

* * * * *